(12) United States Patent
Lightowler

(10) Patent No.: US 7,082,419 B1
(45) Date of Patent: Jul. 25, 2006

(54) NEURAL PROCESSING ELEMENT FOR USE IN A NEURAL NETWORK

(75) Inventor: Neil Lightowler, Aberdeen (GB)

(73) Assignee: Axeon Limited (GB)

( * ) Notice: Subject to any disclaimer, the term of this patent is extended or adjusted under 35 U.S.C. 154(b) by 0 days.

(21) Appl. No.: 09/890,816

(22) PCT Filed: Feb. 1, 2000

(86) PCT No.: PCT/GB00/00277

§ 371 (c)(1),
(2), (4) Date: Aug. 1, 2001

(87) PCT Pub. No.: WO00/45333

PCT Pub. Date: Aug. 3, 2000

(30) Foreign Application Priority Data

Feb. 1, 1999 (GB) ................................. 9902115.6

(51) Int. Cl.
*G06N 3/063* (2006.01)
*G06F 7/00* (2006.01)
(52) U.S. Cl. ........................................................ 706/15
(58) Field of Classification Search ............. 706/15–44
See application file for complete search history.

(56) References Cited

U.S. PATENT DOCUMENTS 5,165,010 A * 11/1992 Masuda et al. ................ 706/42

5,937,202 A * 8/1999 Crosetto ....................... 712/19
6,247,110 B1 * 6/2001 Huppenthal et al. .......... 712/15

FOREIGN PATENT DOCUMENTS

| EP | 0557997 A | 9/1993 |
| EP | 0694852 A | 1/1996 |
| EP | 0718757 A | 6/1996 |

OTHER PUBLICATIONS

Conference Record of the Thirty-Eighth Asilomar Conference on Signals, Systems and Computers IEEE Cat. No. 04CH37592) Signals, Systems and Computers, 2004. Conference Record of the Thirty-Eighth Asilomar Conference on vol. 1, Nov. 7-10, 2004.*

(Continued)

*Primary Examiner*—Anthony Knight
*Assistant Examiner*—Michael B. Holmes
(74) *Attorney, Agent, or Firm*—Nixon Peabody LLP

(57) ABSTRACT

A neural processing element for use in a modular neural network is provided. One embodiment provides a neural network comprising an array of autonomous modules (300). The modules (300) can be arranged in a variety of configurations to form neural networks with various topologies, for example, with a hierarchical modular structure. Each module (300) contains sufficient neurons (100) to enable it to do useful work as a stand alone system, with the advantage that many modules (300) can be connected together to create a wide variety of configurations and network sizes. This modular approach results in a scaleable system that meets increased workload with an increase in parallelism and thereby avoids the usually extensive increases in training times associated with unitary implementations.

30 Claims, 17 Drawing Sheets

OTHER PUBLICATIONS

Botros N.M. et al., IEEE Tranactions on Industrial Electronics, US, IEEE Inc. New York, vol. 41, No. 6, pp. 665-667 (1994). XP000506435.

Yasunaga M. et al., IEEE Journal of Solid-State Circuits, US, IEEE Inc. New York, vol. 28, No. 2, pp. 106-113 (1993). XP000338332.

* cited by examiner

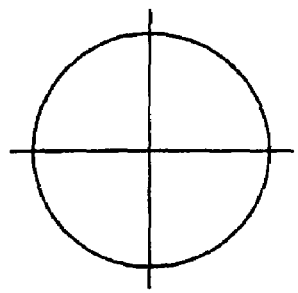
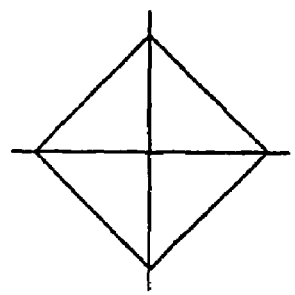
*Fig. 1a*   *Fig. 1b*
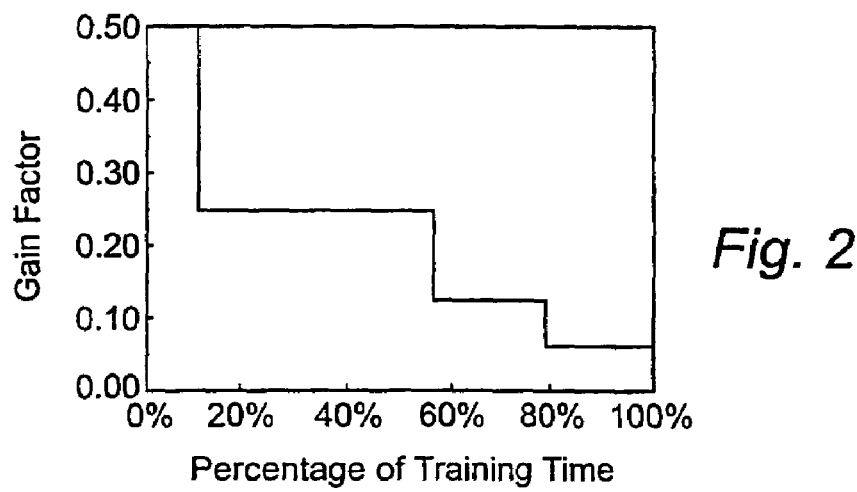
*Fig. 2*
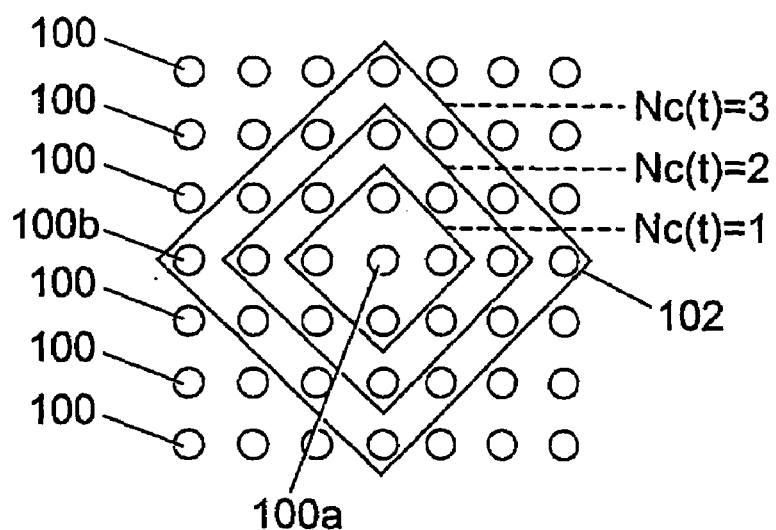
*Fig. 3*

99 Element Vectors - - - -
16 Element Vectors ———

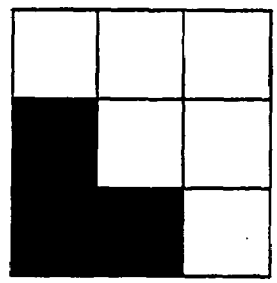 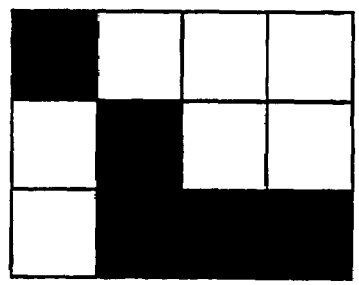
Fig. 19a     Fig. 19b
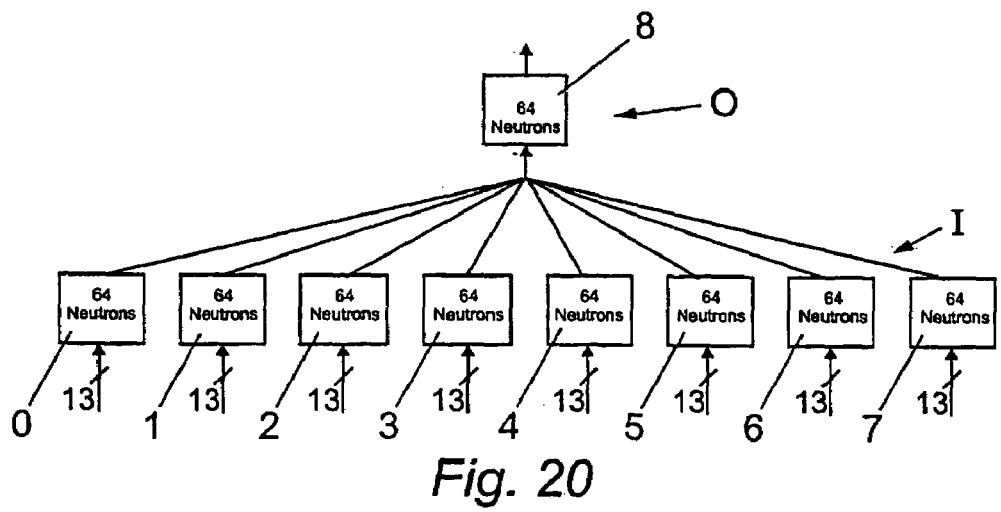
Fig. 20
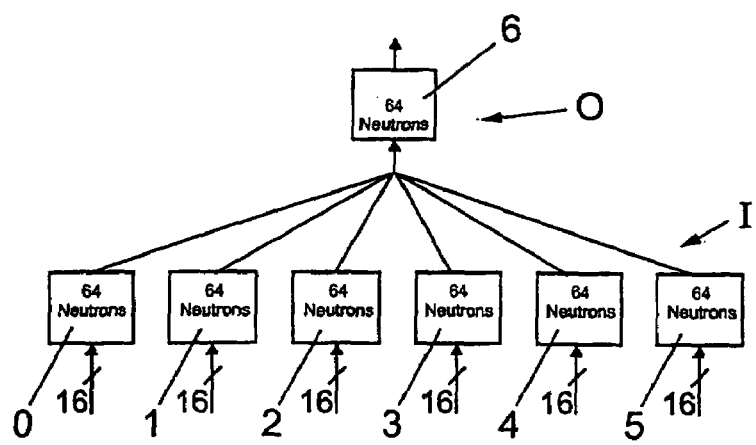
Fig. 21

☐ No Activation
■ 10KN
▨ 20KN
▤ 30KN
☐ 40KN
∗ Blind

☐ No Activation
■ 10KN
▨ 20KN
▤ 30KN
☐ 40KN
∗ Blind

NEURAL PROCESSING ELEMENT FOR USE IN A NEURAL NETWORK

This application is the U.S. national phase application of PCT International Application No PCT/GB99/03250 filed 30 Sep. 1999.

The present invention relates to a neural processing element for use in a neural network (NN). Particularly, but not exclusively, the invention relates to a scalable implementation of a modular NN and a method of training thereof. More particularly, a hardware implementation of a scalable modular NN is provided.

Artificial Neural Networks (ANNs) are parallel information processing systems, whose parallelism is dependent not only on the underlying architecture/technology but also the algorithm and sometimes on the intended application itself.

When implementing ANNs in hardware difficulties are encountered as network size increases. The underlying reasons for this are silicon area, pin out considerations and inter-processor communications. One aspect of the invention seeks to provide a scalable ANN device comprising a modular system implemented on a chip which seeks to mitigate or obviate the difficulties encountered as the required network size on the device increases. By utilising a modular approach towards implementation, it is possible to adopt a partitioning strategy to overcome the usual limitations on scalability. Only a small number of neurons are required for a single module and separate modules can be implemented on separate devices.

For example, in a digital environment, two factors that can limit the scalability of a neural network are the requirements for implementing digital multipliers and the storage of reference vector values.

Scalable systems are difficult to implement because of the communications overheads that increase proportionately to the network size. The invention seeks to mitigate this problem by providing a fine grain implementation of an neural network in which each neuron is mapped to a separate processing element, and in which the multiplier unit of Kohonen's original Self-Organising Map (SOM) algorithm (*Tuevo Kohonen, Self-Organising Maps*, Springer series in information sciences, *Springer-Verlag*, Germany, 1995) is replaced by an arithmetic shifter, thus reducing the resources required. Other algorithms that can provide a scalable implementation could however be used, in particular algorithms that can form topological maps of their input space.

Each module of the invention is a self-contained neural network, however the network can be expanded by adding modules according to a predetermined structure. Lateral expansion is thus catered for. The map structure is in one embodiment of the invention hierarchical, which enable large input vectors to be catered for without significantly increasing the system training time.

The processing elements, i.e., the neurons, of the invention perform two functions, calculating a distance according to a suitable metric, for example, a Manhattan distance, and also updating the reference vectors. The reference vectors are updated serially, however, the distance vectors are calculated in parallel, and arbitration logic, for example, a binary tree, is provided to ensure that only a single processing element can output data at any one time.

One embodiment of the invention seeks to obviate problems known in the art to be associated with the expandability of neural networks implemented in hardware by providing a hardware implementation of a modular ANN with fine grain parallelism in which a single processing element performs the functionality of a single neuron. Each processing element is implemented as a single neuron, each neuron being implemented as Reduced Instruction Set Computer processors optimised for neural processing.

Global information, i.e., data required by all neurons on the device, is held centrally by the module controller. Local information, i.e. the data required by the individual neurons, is held in registers forming part of each neuron. Parallelism is maximised by each neuron performing system computation so that individual neurons identify for themselves when they are in the current neighbourhood.

Each neuron has its own reference vector against which input vectors are measured. When an input vector is presented to the neural network, it is passed to all neurons constituting the network. All neurons then proceed calculate the distance between the input vector and the reference vector, using a distance metric. It is a feature of the invention that the distance metric can be determined using an adder/subtractor unit, for example, the Manhattan distance metric.

When all neurons in the network have determined their respective distances they communicate via lateral connections with each other to determine which amongst is them has the minimum distance between its reference vector and the current input; i.e., which is the 'winner', or active neuron.

The Modular Map implementation of the invention thus maintains strong local connections, but determination of the 'winner' is achieved without the communications overhead suggested by Kohonen's original algorithm. All neurons constituting the network are used in the calculations to determine the active neuron and the workload is spread among the network as a result.

During the training phase of operation all neurons in the immediate vicinity of the active neuron update their reference vectors to bring them closer to the current input. The size of this neighbourhood changes throughout the training phase, initially being very large and finally being restricted to the active neuron itself. The Modular Map approach of the invention utilises Manhattan distance to measure the neighbourhood, which results in a diamond shape neighbourhood.

The invention incorporates a mechanism to enable the multiplication of the metric distances by fractional values representing the proportion of the distance between the input and reference vectors. These fractional values are determined by a gain factor $\alpha(t)$, which is restricted to discrete values, for example, negative powers of two. $\alpha(t)$ is used to update the reference vector values, and by restricting $\alpha(t)$, the required multiplication can be implemented by an arithmetic shifter, which is considerably less expensive in terms of hardware resources than a full multiplier unit.

A fully digital ANN hardware implementation known in the art was proposed by Ruping et al. This system comprises 16 devices, each device implementing 25 neurons as separate processing elements. Network size can be increased by using several devices. However, these devices only contain neurons; there is no local control for the neurons on a device. An external controller is required to interface with these devices and control the actions of their constituent neurons. Consequently, the devices are not autonomous, which can be contrasted with the Modular Map NN device of the invention.

The invention seeks to provide a Modular Map implementation in which each module contains sufficient neurons to enable it to do useful work as a stand alone system, with the advantage that many modules can be connected together to create a wide variety of configurations and network sizes. This modular approach results in a scaleable system that meets increased workload with an increase in parallelism and thereby avoids the usually extensive increases in training times associated with unitary implementations.

STATEMENTS OF INVENTION

According to one aspect of the invention, there is provided a neural processing element for use in a neural network, the processing element comprising:
- arithmetic logic means;
- an arithmetic shifter mechanism;
- data multiplexing means;
- memory means;
- data input means including at least one input port;
- data output means including at least one output port; and
- control logic means.

Preferably, each neural processing element is a single neuron in a neural network.

Preferably, the processing element further includes a data bit-size indicator means. Preferably, the data bit-size indicator means enables operations on different bit-size data values to be executed using the same instruction set.

Preferably, the processing element further includes at least one register means. Preferably, said register means operates on different bit-size data in accordance with said data bit-size indicator means.

According to a second aspect of the invention, a neural network controller is provided for controlling the operation of at least one processing element according to the first aspect of the invention, the controller comprising:
- control logic means;
- data input means including at least one input port;
- data output means including at least one output port;
- data multiplexing means;
- memory means;
- an address map; and
- at least one handshake mechanism.

Preferably, the memory means includes programmable memory means.

Preferably, the memory means includes buffer memory associated with said data input means and/or said data output means.

According to a third aspect of the invention, a neural network module is provided, the module comprising an array of processing elements according to the first aspect of the invention and at least one module controller according to the second aspect of the invention.

Preferably, the number of processing elements in the array is a power of two.

According to a fifth aspect of the invention, a modular neural network is provided comprising either one module according to the third aspect of the invention or at least two neuron modules according to the third aspect of the invention coupled together.

The neuron modules may be coupled in a lateral expansion mode and/or a hierarchical mode.

Preferably, the network includes synchronisation means to facilitate data input to the network. Preferably, the synchronisation means enables data to be input only once when the modules are coupled in a hierarchical mode. The synchronisation means may include the use of a two-line handshake mechanism.

According to a fifth aspect of the invention, a neural network device is provided, the device comprising an array of neural processing elements according to the first aspect of the invention implemented on the neural network device with at least one module controller according to the second aspect of the invention.

Preferably, the device is a field programmable gate array (FPGA) device.

Alternatively, the device may be a full-custom very large scale integration (VLSI) device, a semi-custom VLSI device, or an application specific integrated circuit (ASIC) device.

According to a sixth aspect of the invention, a method of training a neural network is provided, the method comprising the steps of:
- providing a network of neurons, wherein each neuron is reads an input vector applied to the input of the neural network;
- enabling each neuron to calculate its distance between the input vector and a reference vector according to a predetermined distance metric, wherein the neuron with the minimum distance between its reference vector and the current input becomes an active neuron;
- outputting the location of the active neuron; and
- updating the reference vectors for all neurons located within a neighbourhood around the active neuron.

Preferably, the predetermined distance metric is the Manhattan distance metric.

Preferably, each neuron of the neural array updates its reference vector if it is located within a step-function neighbourhood.

More preferably, the step-function neighbourhood is a square function neighbourhood rotated by 45°.

One preferred embodiment of the invention provides a parallel computer system on a device, e.g., a chip, which has the additional capability of being used as a building block to create more powerful and complex computing systems. In this embodiment, the Modular Map is implemented as a programmable Single Instruction stream Multiple Data stream (SIMD) array of processors, its architecture can be optimised for the implementation of Artificial Neural Networks by modifying the known SOM ANN algorithm to replace its multiplier unit with an arithmetic shifter unit.

The preferred embodiment of the invention the Modular Map incorporates 256 individual processing elements per module providing a parallel ANN implementation. A programmable SIMD array enables the Modular Map device to be used to implement other parallel processing tasks in addition to neural networks. On-chip learning is supported to allow rapid training and continuous adaptation is available to enable good classification rates to be maintained for temporal data variations that would otherwise require the network to be retrained. The Modular Map can be adapted and has no predetermined limit for the maximum input vector size or network size. This facilitates the application of Modular Maps to problems previously regarded as too complex for solution by existing ANN implementations. The Modular system can be reconfigured and existing configurations saved and restored when required to maximise flexibility and allow for part trained or fully trained networks to be utilised, which enables training time to be saved.

This enables the Modular Map to be incorporated into electronic systems to provide solutions for real time problem domains, for example, signal processing (for example in telecommunications, especially mobile communications), intelligent sensors, condition monitoring, and robotics.

In another preferred embodiment of the invention, the Modular Map can be used as part of a traditional computer system to provide an ANN engine or parallel co-processor. This enable such systems to be more efficient when addressing problems such as time series forecasting, combinatorial optimisation, data mining, speech processing and image recognition.

Each module has a network training time which can be optimised for real-time situations so that output can be known within, for example, 3.5 μseconds. In one embodiment, the modular map device has 256 separate neurons and is capable of running at 50 MHz. Each module maintains an average propagation delay of less than 3.5 μseconds by providing a performance of 1.2 GCPS and 0.675 GCUPS, i.e., a training time of less than one second can be provided for individual modules In some embodiments of the invention, the modular maps can be configured as stand alone maps, see FIG. 5, i.e., a module can be configured as a one or two dimensional network. In other embodiments of the invention, the Modular Map system has been designed to allow expansion by connecting modules together to cater for changes in network size and/or input vector size, and to enable the creation of novel neural network configurations. For example, when the Modular Maps are connected in a modular lateral topology (see FIG. 6), each module receives the same input vector. This can be contrasted with a hierarchical modular topology (see FIG. 7), in which it is possible to accept input vectors which are larger than the maximum input of each Modular Map.

Embodiments of the present invention shall now be described, with reference to the accompanying drawings in which:—

FIG. 1a is a unit circle for a Euclidean distance metric;

FIG. 1b is a unit circle for a Manhattan distance metric;

FIG. 2 is a graph of gain factor against training time;

FIG. 3 is a diagram showing neighbourhood function;

Figure 4A:
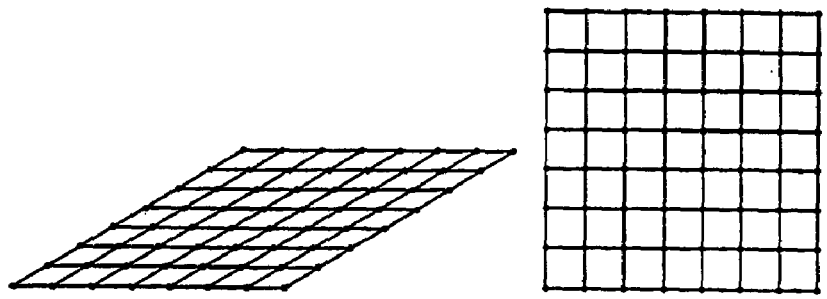
Figure 4B:
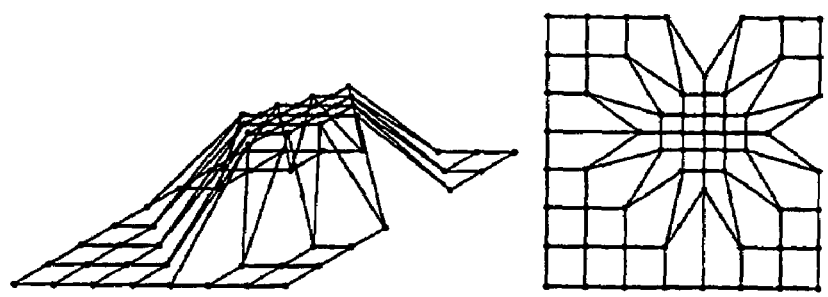
Figure 4C:
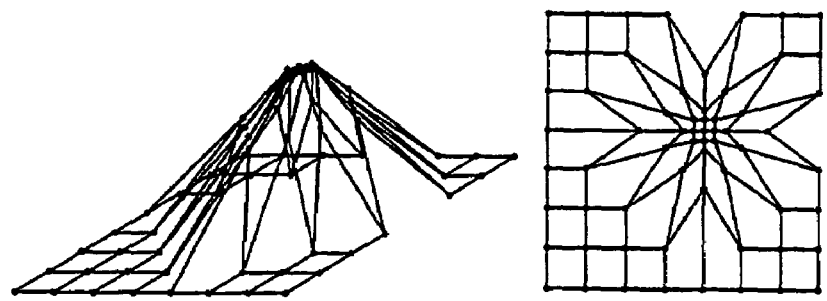
Figure 5:
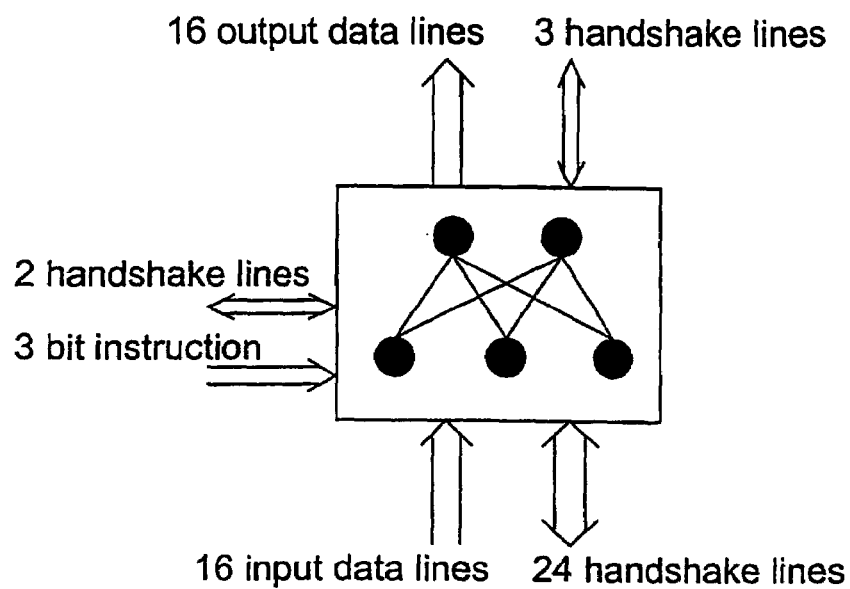
Figure 6:
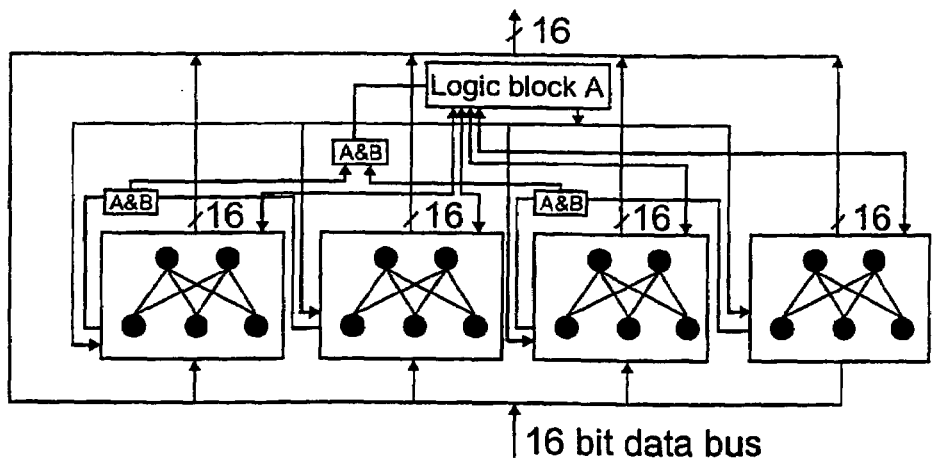
Figure 7:
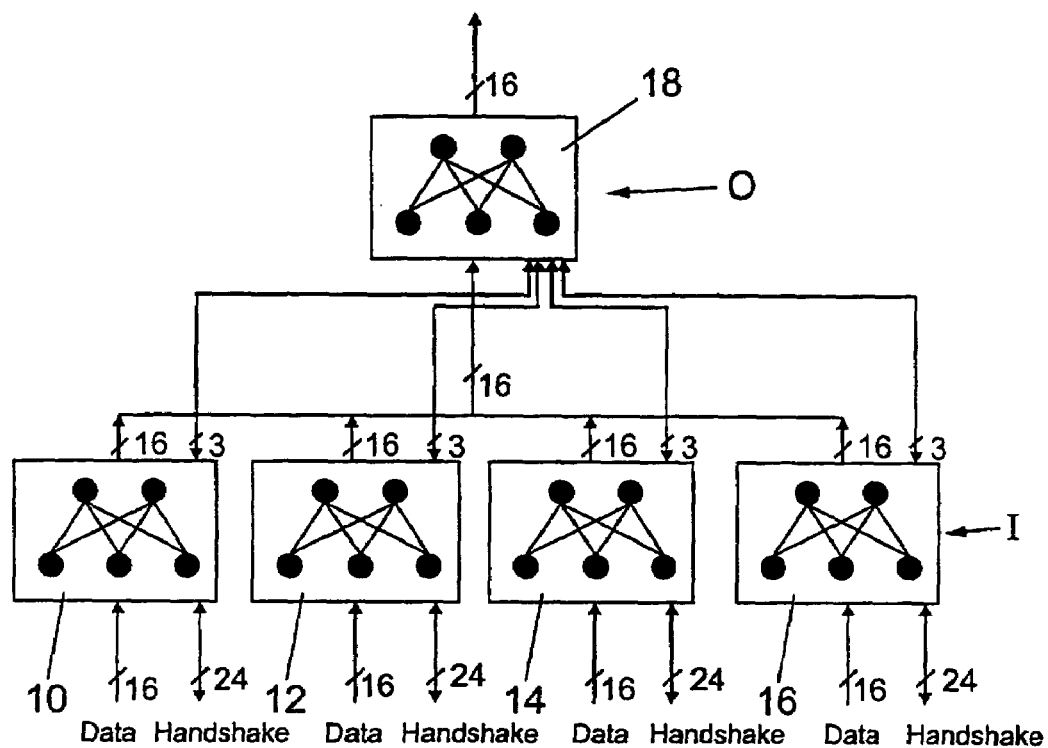
Figure 8:
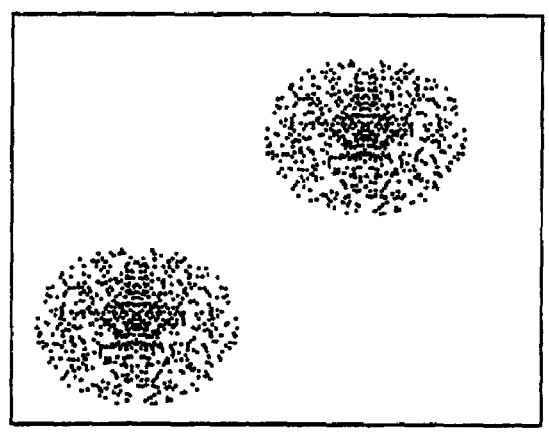
Figure 9:
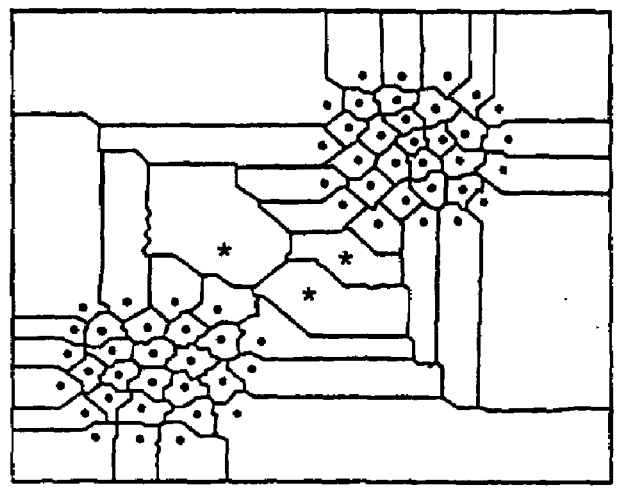
Figure 10:
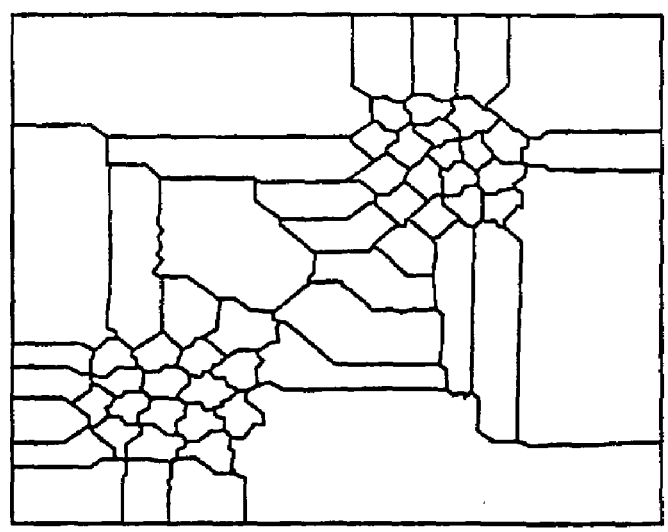
Figure 11:
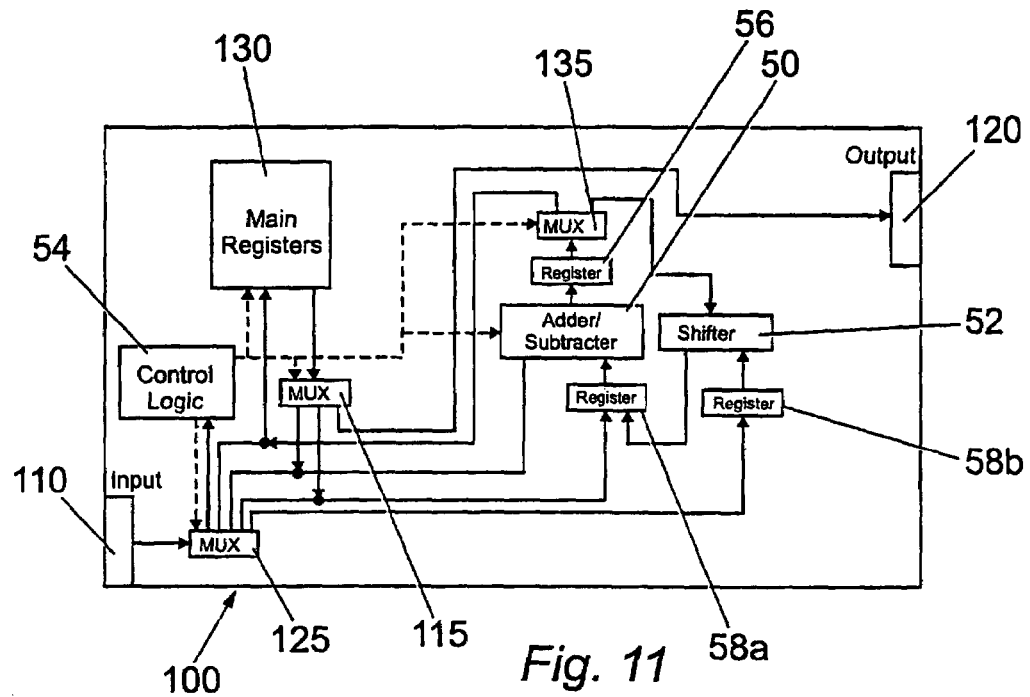
Figure 12:
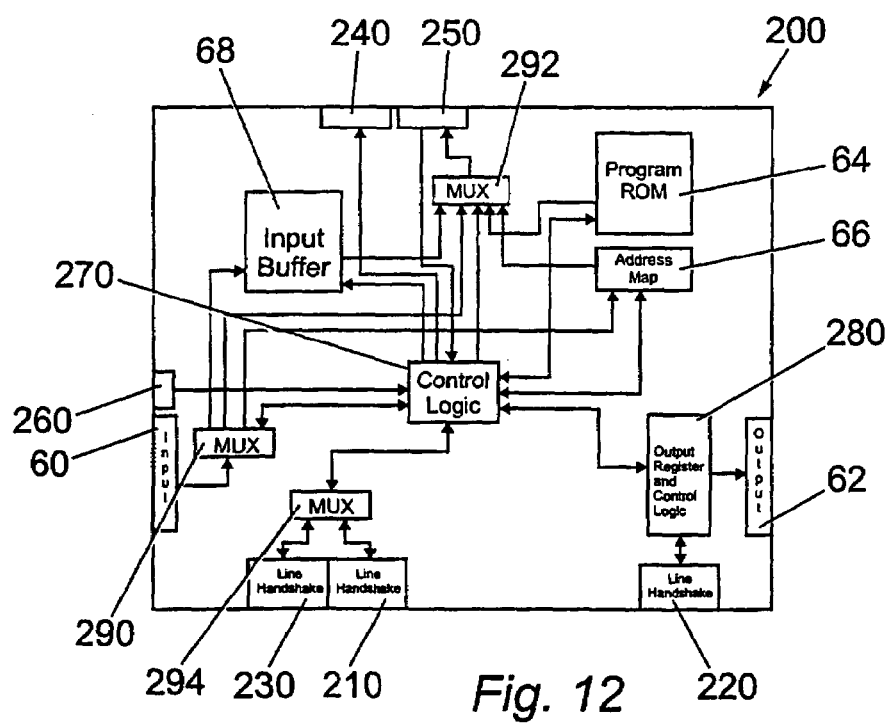
Figure 11A:
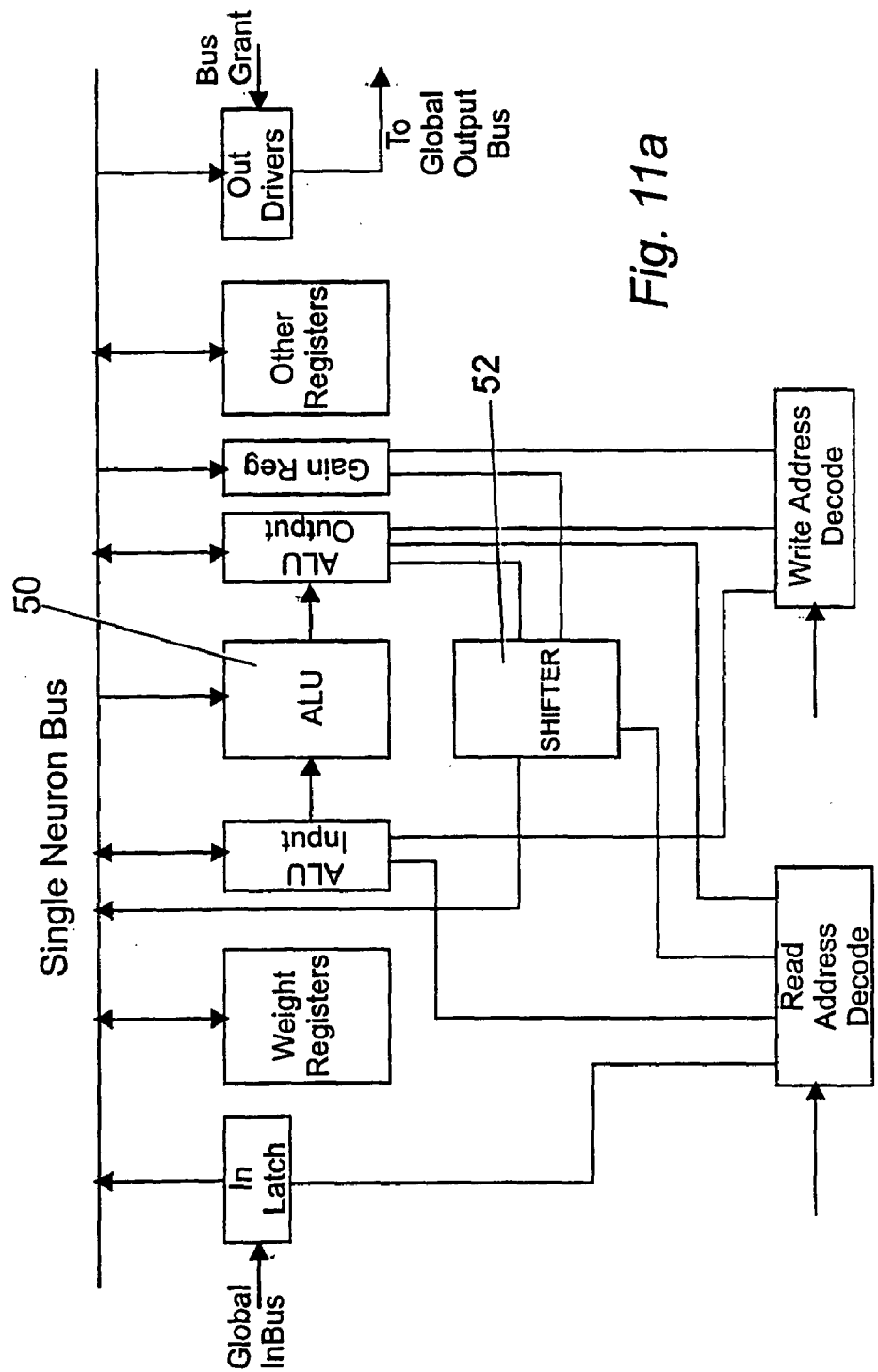
Figure 11B:
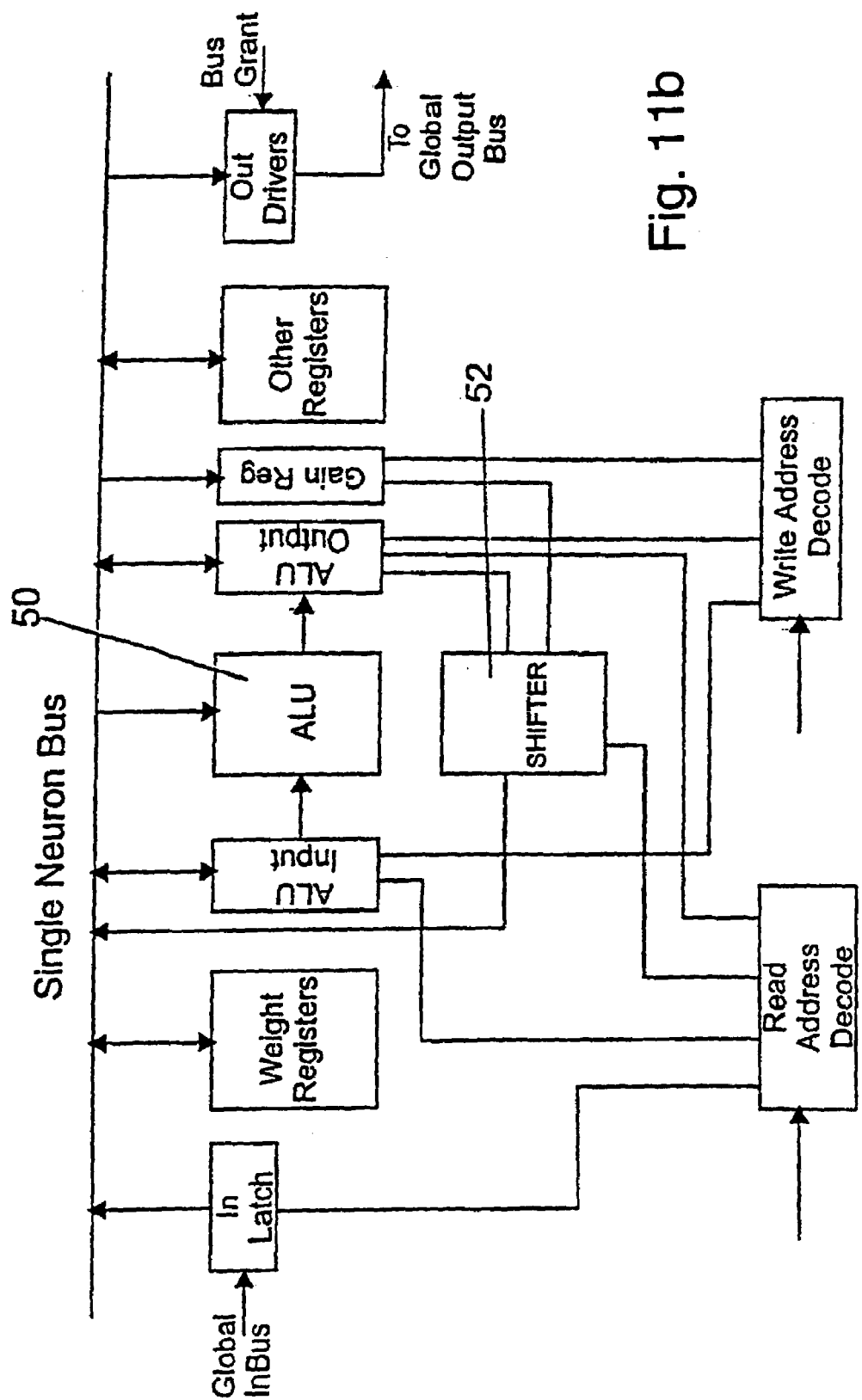
Figure 11C:
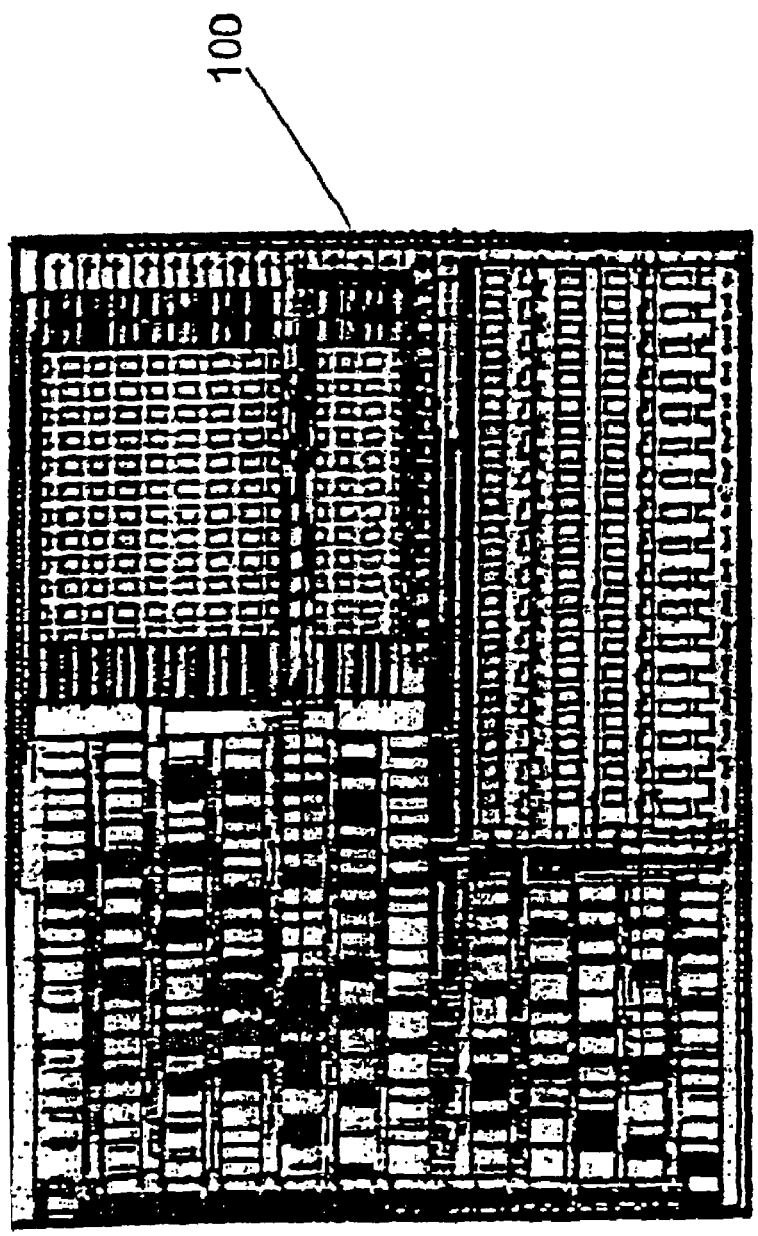
Figure 13:
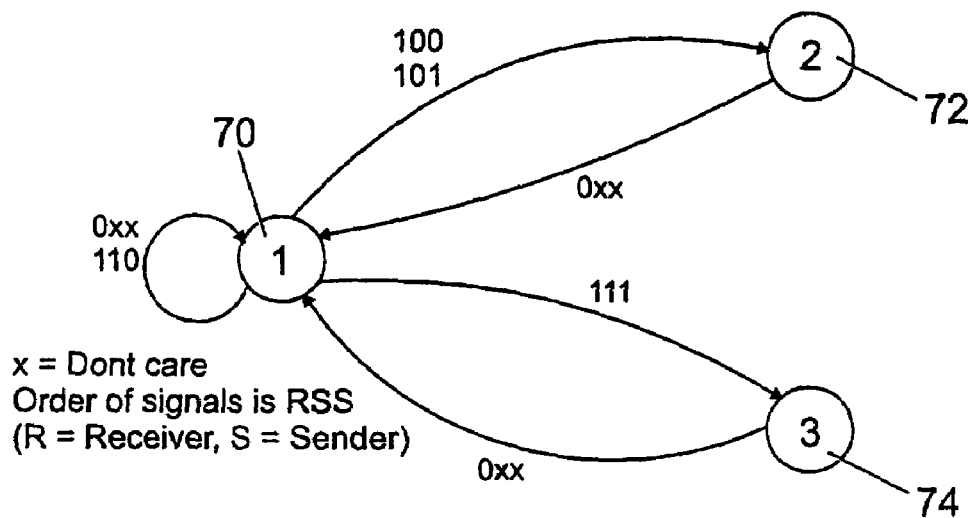
Figure 14:
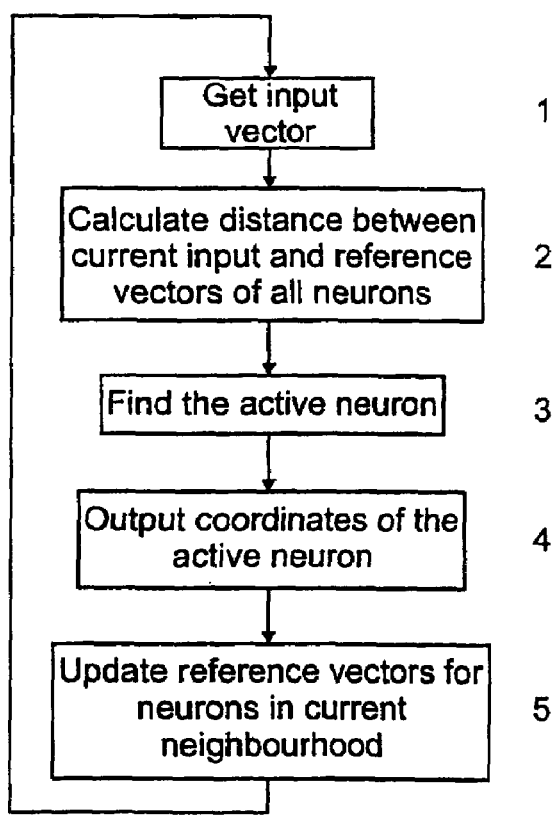
Figure 15:
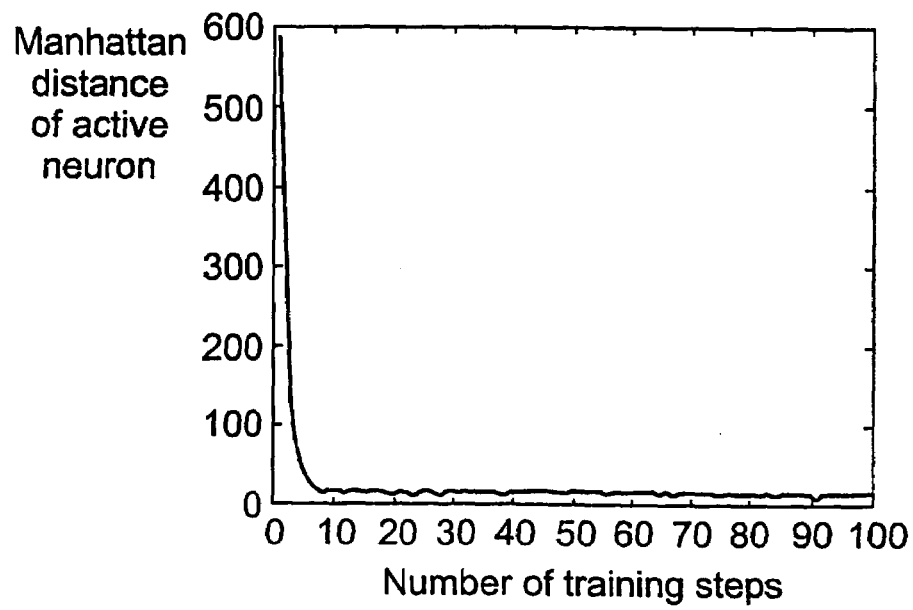
Figure 16:
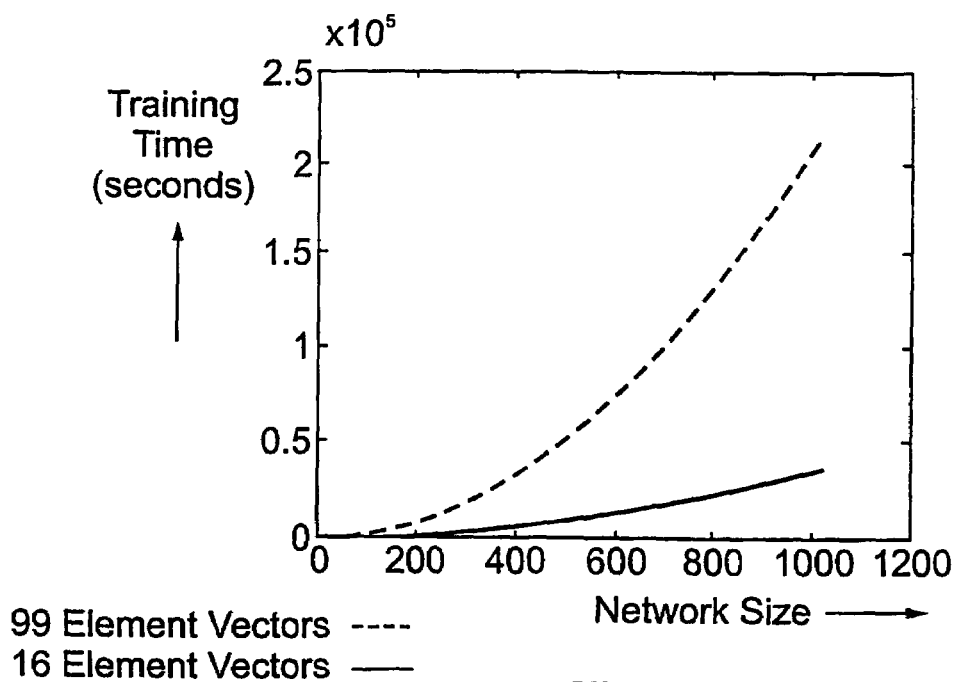
Figure 17:
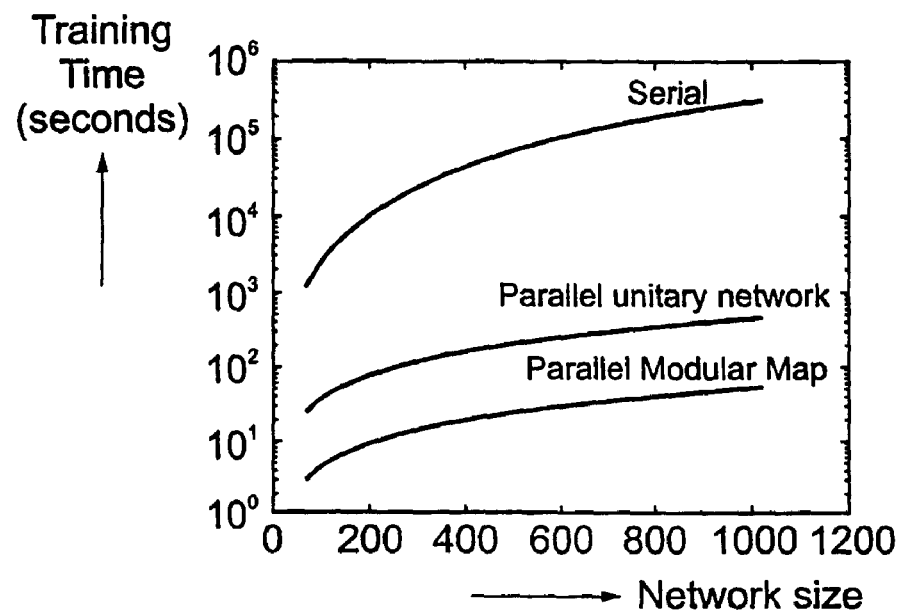
Figure 18:
Figure 22:
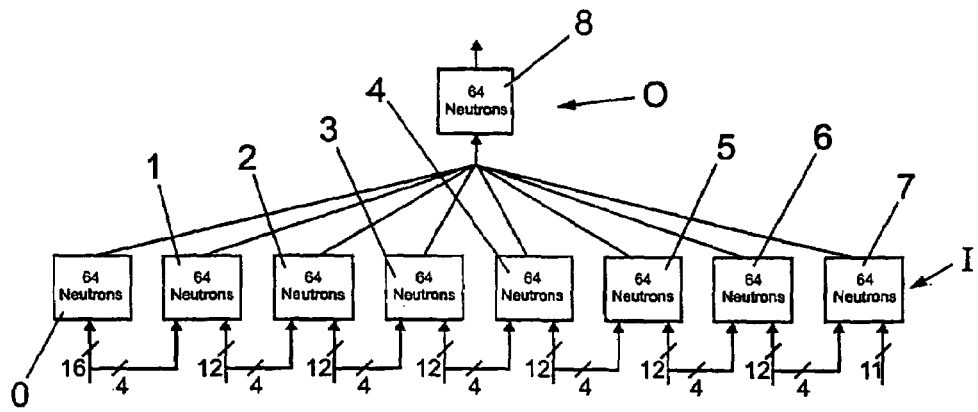
Figure 23:
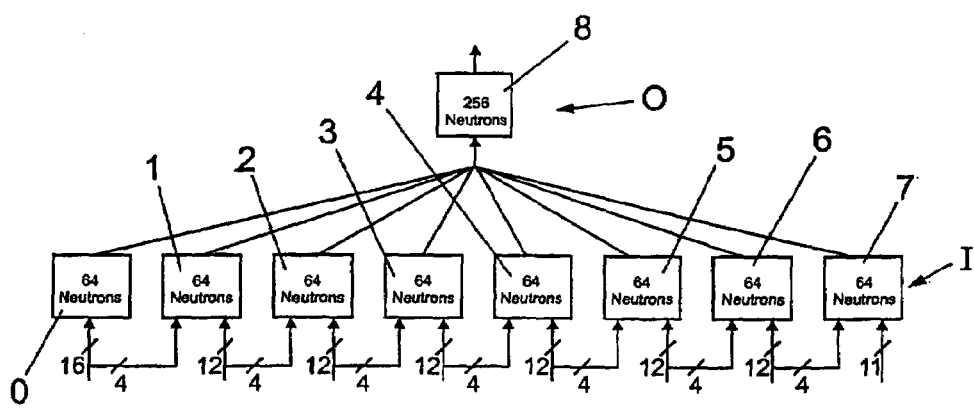
Figure 24:
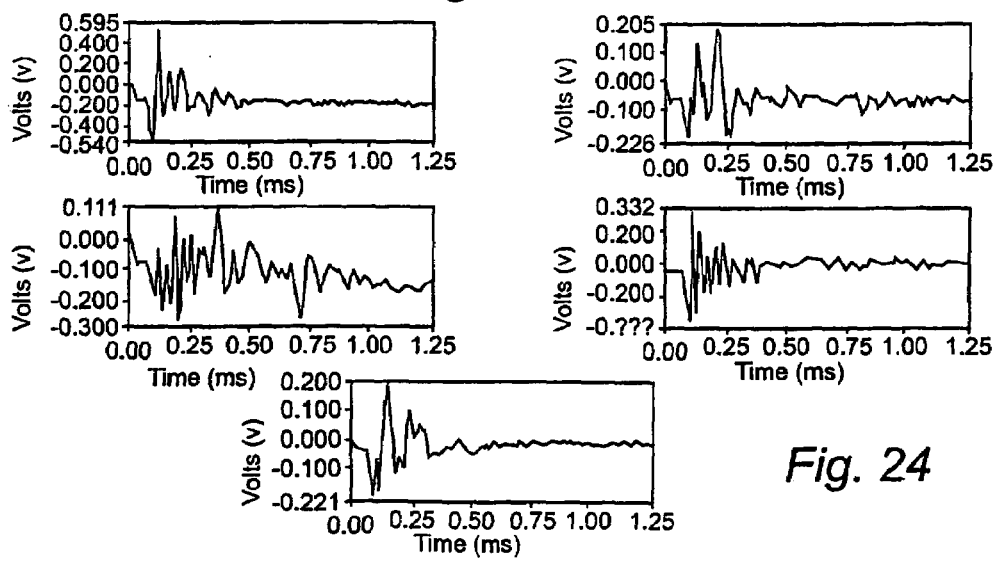
Figure 25:
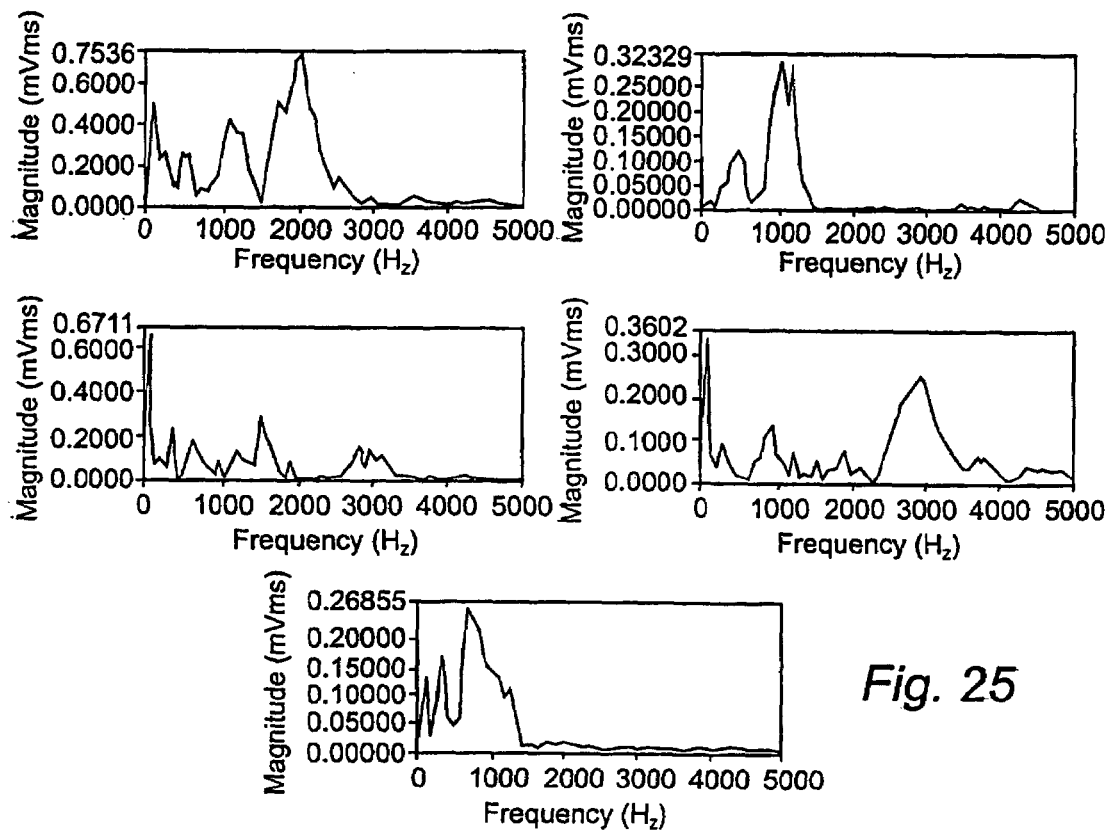
Figure 26:
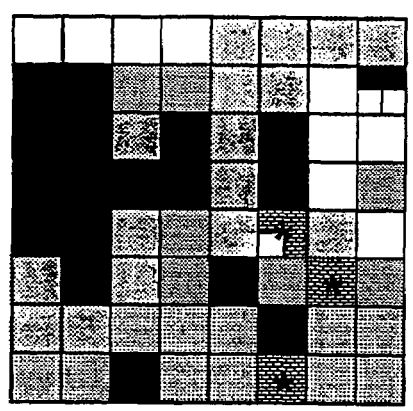
Figure 27:
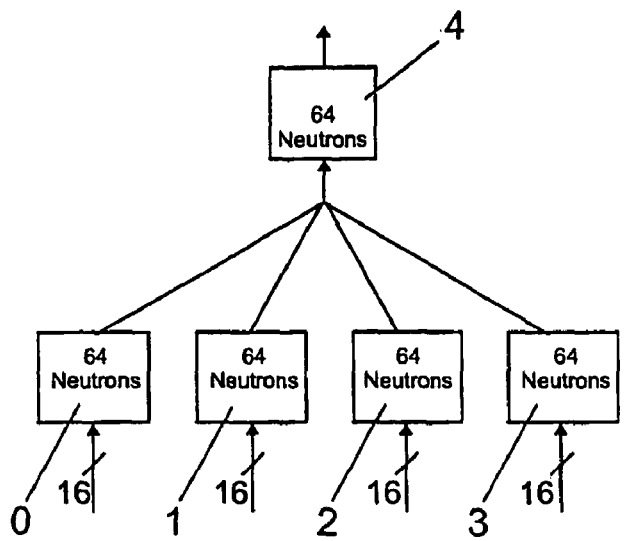
Figure 28:
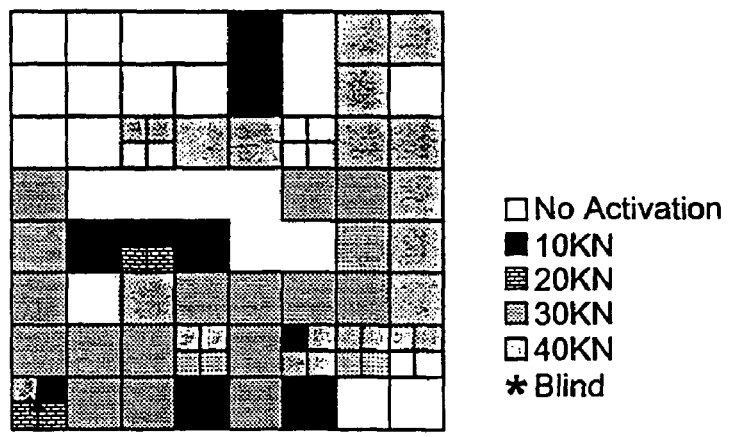
Figure 29:
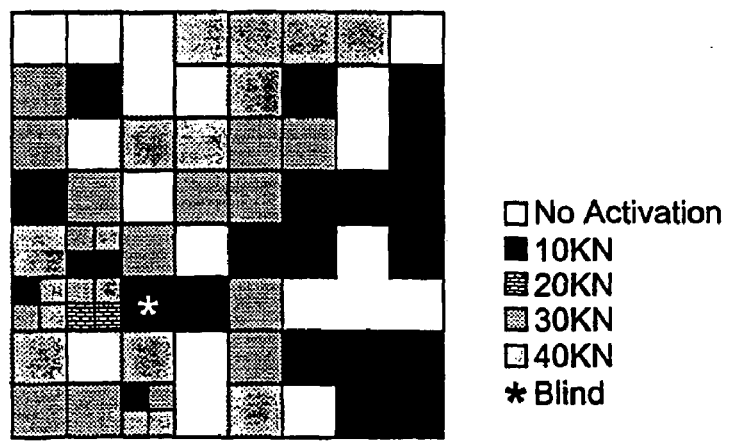
Figure 30:
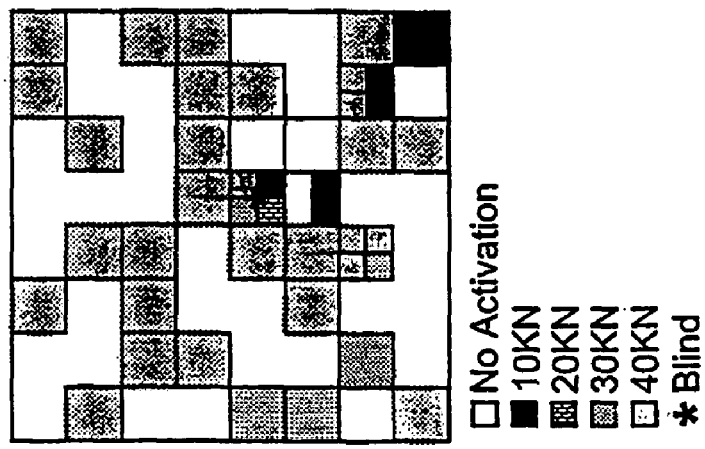
Figure 31:
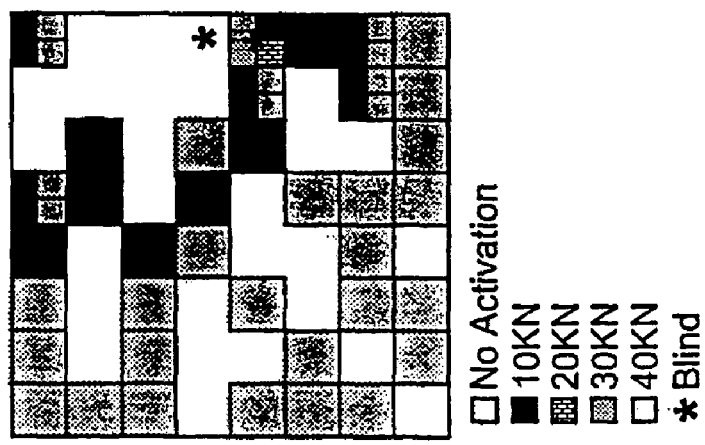

FIGS. 4a–c are examples used to illustrate an elastic net principle;

FIG. 5 is a schematic diagram of a single Modular Map;

FIG. 6 is a schematic diagram of laterally combined Maps;

FIG. 7 is a schematic diagram of hierarchically combined Maps;

FIG. 8 is a scatter graph showing input data supplied to the network of FIG. 7;

FIG. 9 is a Voronoi diagram of a module in an input layer I of FIG. 7;

FIG. 10 is a diagram of input layer activation regions for a level 2 module with 8 inputs;

FIG. 11 is a schematic diagram of a Reduced Instruction Set Computer (RISC) neuron according to an embodiment of the invention;

FIG. 11B is another schematic diagram of a neuron according to an embodiment of the invention;

FIG. 11C is a RISC processor implementation of a neuron according to the embodiment illustrated in FIG. 11B;

FIG. 12 is a schematic diagram of a module controller system;

FIG. 13 is a state diagram for a three-line handshake mechanism;

FIG. 14 is a flowchart showing the main processes involved in training a neural network;

FIG. 15 is a graph of activations against training steps for a typical neural net;

FIG. 16 is a graph of training time against network size using 16 and 99 element reference vectors;

FIG. 17 is a log-linear plot of relative training times for different implementation strategies for a fixed input vector size of 128 elements;

FIG. 18 is example greyscale representation of the range of images for a single subject used in a human face recognition application;

FIG. 19a is an example activation pattern created by the same class of data for a modular map shown in FIG. 23;

FIG. 19b is an example activation pattern created by the same class of data for a 256 neuron self-organising map (SOM);

FIG. 20 is a schematic diagram of a modular map (configuration 1);

FIG. 21 is a schematic diagram of a modular map (configuration 2);

FIG. 22 is a schematic diagram of a modular map (configuration 3);

FIG. 23 is a schematic diagram of a modular map (configuration 4);

FIGS. 24a to 24e are average time domain signals for a 10 kN, 20 kN, 30 kN, 40 kN and blind ground anchorage pre-stress level tests, respectively;

FIGS. 25a to 25e are average power spectrum for the time domain signals in FIGS. 24a to 24e respectively;

FIG. 26 is an activation map for a SOM trained with the ground anchorage power spectra of FIGS. 25a to 25e;

FIG. 27 is a schematic diagram of a modular map (configuration 5);

FIG. 28 is the activation map for module 0 in FIG. 27;

FIG. 29 is the activation map for module 1 in FIG. 27;

FIG. 30 is the activation map for module 2 in FIG. 27;

FIG. 31 is the activation map for module 3 in FIG. 27; and

Figure 32:
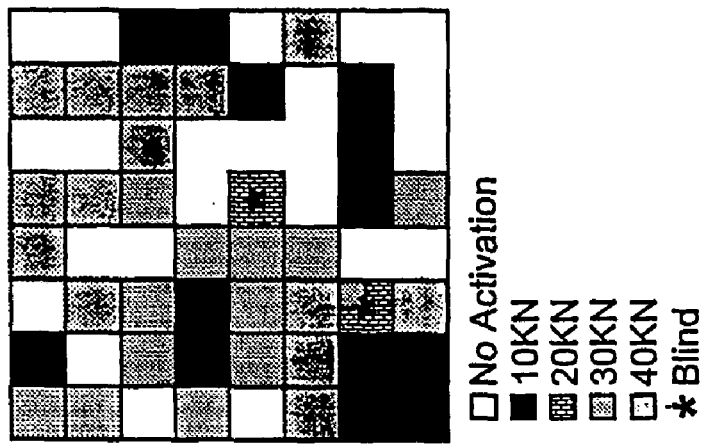

FIG. 32 is the activation map for an output module (module 4) in FIG. 27.

Referring to FIG. 11 of the drawings, the structure of an individual neural processing element 100 for use in a neural network according to one embodiment of the invention is illustrated. In this embodiment of the invention, the neural processing element 100 is an individual neuron. The neuron 100 is implemented as a RISC processor optimised for ANNs type applications. Each Modular Map consists of several such neurons networked together to form a neural array.

The Neuron

In the array, each neuron 100 has a set of virtual co-ordinates associated with it, e.g. Cartesian co-ordinates. Assuming a two-dimensional index for simplicity, the basic operation of a modular map can be considered as follows:

The multidimensional Euclidean input space $\Re^n$, where $\Re$ covers the range (0, 255) and (0<n≤16), is mapped to a two dimensional output space $\Re^2$ (where the upper limit on $\Re$ is variable between 8 and 255) by way of a non-linear projection of the probability density function. (Obviously, other suitably dimensioned output spaces can be used depending on the required application, e.g., 3-D, $\Re^3$.)

An input vector $x=[\xi_1, \xi_2, \ldots, \xi_n] \in \Re^n$ is presented to all neurons 100 in the network. Each neuron 100 in the network has a reference vector $m_i=[\mu_{i1}, \mu_{i2}, \ldots, \|_{in}] \in \Re^n$ where $\mu_{ij}$ are scalar weights, i is the neuron index and j the vector element index.

All neurons 100 simultaneously calculate the distance between their reference vectors and the current input vector. The neuron with minimum distance between its reference vector and the current input (i.e. greatest similarity) becomes the active neuron 100a (see, for example, FIG. 3). A variety of distance metrics can be used as a measure of similarity, for example, the family of Minkowski metrics, in which the distance between two points a and b is given by $$L_p = (|a-b|^p + |a-b|^p)^{1/p}$$

and in which, for example, Euclidean distance is the $L_2$ metric (see FIG. 1a for example), and Manhattan distance is the $L_1$ metric (see FIG. 1b for example).

In FIG. 1a, the unit circle is projected according to a Euclidean distance metric, whereas FIG. 1b illustrates the unit circle of FIG. 1a projected according to a Manhattan metric.

In the Manhattan Metric, the active neuron 100a is given by $$\sum_{j=0}^{n} |\xi_j - \mu_{cj}| = \min\left\{\sum_{j=0}^{n} |\xi_j - \mu_{ij}|\right\}_{i=1}^{k}$$

where k=network size.

By associating a 2-D Cartesian co-ordinate with each neuron, a 2-D output space $\Re^2$ is created, where the upper limit on $\Re$ can vary between 8 and 255. This thus maps the original n-dimensional input to the 2-D output space by way of a non-linear projection of the probability density function.

The 2-D Cartesian co-ordinates of the active neuron 100a are then used as output from the modular map. The distance between the reference vector of the active neuron 100a and the current input (the activation value) can also be stored in suitable memory means to be made available when required by an application. For example, during network training, the activation value may be made available before the reference vector values are updated.

During training, after the active neuron 100a has been identified, reference vectors are updated to bring them closer to the current input vector. A reference vector is changed by an amount determined by its distance from the input vector and the current gain factor $\alpha(t)$. In a network of neurons, all neurons 100b within the neighbourhood of the active neuron 100a (shown schematically in FIG. 3) update their reference vectors, otherwise no changes are made. The updated reference vectors $m_i(t+1)$ are given by:—

$m_i(t+1)=m_i(t)+\alpha(t)[x(t)-m_i(t)]$ if $i \in N_c(t)$ and $m_i(t+1)=m_i(t)$ if $i \in N_c(t)$ where $N_c(t)$ is the current neighbourhood and t=0, 1, 2 . . .

One embodiment of the invention uses a square, step function neighbourhood defined by the Manhattan distance metric which is used by individual neurons 100 to determine if they are in the current neighbourhood when given the index of the active neuron 100a (see FIG. 3). FIG. 3 is a diagram showing the neighbourhood function 102 when a square, step function neighbourhood is used. By adopting a square, step function neighbourhood and rotating it through 45 degrees so that it adopts the configuration shown in FIG. 3, it has been found that the Modular Map neural network has similar characteristics to the Kohonen SOM and gives comparable results when evaluated.

Both the gain factor and neighbourhood size decrease with time from their original start-up values throughout the training process. Due to implementation considerations these parameters are constrained to a range of discreet values rather than the continuum suggested by Kohonen. However, the algorithms are chosen to calculate values for gain and neighbourhood size which facilitate convergence of reference vectors in line with Kohonen's original algorithm.

The gain factor $\alpha(t)$ used is restricted to discrete values, for example, fractional values such as negative powers of two, to simplify implementation. FIG. 2 is a graph of gain factor $\alpha(t)$ against training time when the gain factor $\alpha(t)$ is restricted to negative powers of two. By restricting the gain factor $\alpha(t)$ in this way it is possible to use a bit shift operation for multiplication rather than a hardware multiplier which would require more resources and increase the complexity of the implementation.

In the embodiment of the invention illustrated in FIG. 11, the neural processing element is a single neuron 100 implemented as a RISC processor. The neuron 100 includes arithmetic logic means, for example, an arithmetic logic unit (ALU) including an adder/subtractor 50, a shifter mechanism 52, memory means, data multiplexing means 115, 125, 135, control logic 54, data input means 110, data output means 120, and a set of registers 56, 58a, 58b, 130.

Further illustrations of a neuron 100, are provided by FIG. 11B, and FIG. 11C. FIG. 11B is a schematic diagram of the neuron, and FIG. 11C illustrates the layout of the neuron shown schematically in FIG. 11B when implemented as a RISC processor.

Referring back to FIG. 11, the ALU is the main computational component and utilises the arithmetic shifter mechanism 52 to perform all multiplication-type functions (i.e., those functions which, if the Euclidean metric were used, would require a multiplier unit when implementing an SOM-type network).

All registers 58a, 58b, 56, 130 in the neuron are individually addressable as 8 or 12 bit registers although individual bits are not directly accessible.

Instructions are received by the neuron 100 from a module controller via input means 110 (e.g. an input port) and local control logic 54 interprets these instructions and co-ordinates the operations of the neuron 100.

The adder/subtractor unit of the ALU 50 is the main computational element within the neuron. The neuron is capable of performing both 8 bit and 12 bit arithmetic. In order to avoid variable execution times for the different calculations to be performed a 12 bit adder/subtractor unit is preferable. It is possible for a 4 bit adder/subtractor unit or an 8 bit adder/subtractor unit to be used in alternative embodiments to do both the 8 bit and 12 bit arithmetic. However, the execution times for different sizes of data are considerably different if a 12 bit adder/subtractor unit is not used. If a 12 bit adder/subtractor unit is used, a conventional Carry Lookahead Adder (CLA) can be utilised which requires approximately 160 logic gates, which produces a propagation delay equal to the delay of 10 logic gates.

In this embodiment of the invention, the ALU design has a register-memory architecture, and arithmetic operations are allowed directly on register values. In FIG. 11, the ALU adder/subtractor 50 is directly associated with two registers 56, and 58a and also with two flags, a zero flag, which is set when the result of an arithmetic operation is zero, and a negative flag, which is set when the result is negative.

The registers 56, 58a associated with the ALU are both 12 bit; a first register 56 is situated at the ALU output; a second register 58a is situated at one of the ALU inputs. The first register 56 at the output from the ALU adder/subtractor 50 is used to buffer data until it is ready to be stored. Only a single 12 bit register 58a is required at the input to the ALU 50 as part of an approach that allows the length of instructions to be kept to a minimum.

In this embodiment of the invention, the instruction length used for a neuron 100 is too small to include an operation and the addresses of two operands in a single instruction.

The second register 58a at one of the ALU inputs is used to store the first datum for use in any following arithmetic operations. The address of the next operand can be provided with the operator code and, consequently, the second datum can be accessed directly from memory.

The arithmetic shifter mechanism 52 is required during the update phase of operation (described in more detail later herein) to multiply the difference between input and reference vector elements by the gain factor value $\alpha(t)$.

In this embodiment of the invention, the gain factor $\alpha(t)$ is restricted to a predetermined number of discrete values. For example, negative powers of two, in which case four gain values (i.e. 0.5, 0.25, 0.125 and 0.0625) may be used and the shifter mechanism 52 is required to shift right by 0, 1, 2, 3 and 4 bits to perform the required multiplication.

The arithmetic shifter mechanism 52 is of a conventional type which can be implemented using flip flops, and requires less resources which would be required to implement a full multiplier unit. For the bit shift approach to work correctly, weight values (i.e., reference vector values) are required to have as many additional bits as there are bit shift operations (i.e. given that a weight value is 8 bits, when 4 bit shifts are allowed, 12 bits need to be used for the weight value). The additional bits store the fractional part of weight values and are only used during the update operation to ensure convergence is possible; there is no requirement to use this fractional part of weight values while determining Manhattan distance.

In this embodiment, the arithmetic shifter 52 is positioned in the data stream between the output of the ALU and its input register 58a, but is only active when the gain value is greater than zero. This limits the number of separate instructions required by using gain factor values supplied by the system controller at the start of the update phase of operations. The gain factor values can then be reset to zero at the end of this operational phase.

According to this embodiment of the invention, each RISC neuron 100 holds 280 bits of data, but in other embodiments of the invention the number of bits of data held may be different. Sufficient memory means must however, be provided in all embodiments to enable the system to operate effectively and to enable sufficient simultaneous access of weight values (i.e., reference vectors) by the neurons when in a neural network. In this embodiment, the memory is located on the neural network device. The on-chip memory ensures the registers are rapidly accessible by the neuron, especially the register containing the reference vector values, which are accessed frequently.

Access to weight values is required either 8 or 12 bits at a time for each neuron, depending on the phase of operation. For example, if in one embodiment of the invention 64 neurons are networked, to enable 64 neurons to have simultaneous access to their respective reference vector values, a minimum requirement of 512 bits must be provided on-chip rising to 768 bits (during the update phase).

Alternatively, if a compromise can be achieved between the required data access and the limited pin outs available on a single device, reference vector values could be stored off-chip in other embodiments.

As FIGS. 11 and 11B partly illustrate, the neuron 100 includes several registers. The registers are used to hold reference vector values (16*12 bits), the current distance value (12 bits), the virtual X and Y co-ordinates (2*8 bits), the neighbourhood size (8 bits) and the gain value $\alpha(t)$ (3 bits) for each neuron. There are also input and output registers (2*8 bits), registers for the ALU (2*12), a register for the neuron ID (8 bit) and a one bit register for maintaining an update flag whose function is described in more detail below.

All the registers can be directly addressed by each neuron except for the output register and update flag. The neuron ID is fixed throughout the training and operational phases, and like the input register is a read only register as far as the neuron is concerned.

At start up time all registers except the neuron ID are set to zero values before parameter values are provided by an I/O controller. At this stage the initial weight values are provided by the controller to allow the system to start from either random weight values or values previously determined by training a network. While 12 bit registers are used to hold the weight values, only 8 bits are used for determining a neuron's distance from an input. Only these 8 bits are supplied by the controller at start up; the remaining 4 bits represent the fractional part of the weight value, are initially set to zero, and are only used during weight updates.

The neighbourhood size is a global variable supplied by the controller at start up, and new values are provided by the controller at appropriate times throughout the training process (similar to the gain factor $\alpha(t)$). The virtual co-ordinates are also provided by the controller at start up time, but are fixed throughout the training and operational phases of the system. The virtual co-ordinates provide the neuron with a location from which to determine if it is within the current neighbourhood.

Because virtual addresses are used for neurons, for an embodiment which has 256 neurons and a two-dimensional output space, any neuron can be configured to be anywhere within a $256^2$ neural array. This provides great flexibility when neural networks are combined to form systems using many modules.

It is advantageous for the virtual addresses used in a neural network to maximise the virtual address space (i.e. use the full range of possible addresses in both the X and Y dimensions). For example, if a 64 neuron network module is used, the virtual addresses of neurons along the Y axis should be 0, 0 0, 36 0, 72 etc. In this way the outputs from the module will utilise the maximum range of possible values, which in this instance will be between 0 and 252.

To efficiently manipulate the mixed bit-sized data, an update flag is used as a switch mechanism to indicate data type. A switch mechanism is advantageous as there are different operational requirements depending on the data size (i.e., when 8 bit values and 12 bit values are being used, there are different requirements at different phases of operation).

During the normal operational phase only 8 bit values are necessary but they are required to be the least significant 8 bits, e.g. when calculating Manhattan distance. However, during the update phase of operation both 8 bit and 12 bit values are used. During this update phase all the 8 bit values are required to be the most significant 8 bits and when applying changes to reference vectors the full 12 bit value is required. By using a simple flag as a switch the need for duplication of instructions is avoided so that operations on 8 and 12 bit values can be executed using the same instruction set.

The control logic 54 within a neuron 100 is simple and consists predominantly of a switching mechanism. In this embodiment of the invention, all instructions are the same size, i.e. 8 bits, and there are only a limited number of distinct instructions in total. In this embodiment, thirteen distinct instructions in total are used, however, in other embodiments the total instruction set may be less, for example, only eight distinct instructions.

While an 8 bit instruction set would in theory support 256 separate instructions, one of the aims of the neuron design has been to use a reduced instruction set. In addition, the separate registers within a neuron need to be addressable to facilitate their operation, for example, where an instruction needs to refer to a particular register address, that address effectively forms part of the instruction.

The instruction length cannot exceed the width of the data bus, here for example 8 bits, which sets the upper limit for a single cycle instruction read. The locations of operands for six of the instructions need to be addressed which requires the incorporation of up to 25 separate addresses into the instructions. This requires 5 bits for the address of the operand alone.

The total instruction length can still be maintained at 8 bits, however, as instructions not requiring operand addresses can use some of these bits as part of their instruction. Thus the invention incorporates room for expansion of the instruction set within the instruction space.

In this embodiment of the invention, all instructions for neuron operations are 8 bits in length and are received from the controller. The first input to a neuron is always an instruction, normally the reset instruction to zero all registers. The instruction set is as follows:

| | |
|---|---|
| RDI: | (Read Input) will read the next datum from its input and write to the specified register address. This instruction will not affect arithmetic flags. |
| WRO: | (Write arithmetic Output) will move the current data held at the output register 56 of the ALU to the specified register address. This instruction will overwrite any existing data in the target register and will not affect the systems arithmetic flags. |
| ADD: | Add the contents of the specified register address to that already held at the ALU input. This instruction will affect arithmetic flags and, when the update register is zero all 8 bit values will be used as the least significant 8 bits of the possible 12, and only the most significant 8 bits of reference vectors will be used (albeit as the least significant 8 bits for the ALU) when the register address specified is that of a weight whereas, when the update register is set to one, all 8 bit values will be set as the most significant bits and all 12 bits of reference vectors will be used. |
| SUB: | Subtract the value already loaded at the ALU input from that at the specified register address. This instruction will affect arithmetic flags and will treat data according to the current value of the update register as detailed for the add command. |
| BRN: | (Branch if Negative) will test the negative flag and will carry out the next instruction if it is set, or the next instruction but one if it is not. |
| BRZ: | (Branch if Zero) will test the zero flag and will carry out the next instruction if it is set. If the flag is zero the next but one instruction will be executed. |
| BRU: | (Branch if Update) will test the update flag and will carry out the next instruction if it is set, or the next instruction but one if it is not. |
| OUT: | Output from the neuron the value at the specified register address. This instruction does not affect the arithmetic flags. |
| MOV: | Set the ALU input register to the value held in the specified address. This instruction will not affect the arithmetic flags. |
| SUP: | Set the update register. This instruction does not affect the arithmetic flags. |
| RUP: | Reset the update register. This instruction does not affect the arithmetic flags. |
| NOP: | (No Operation) This instruction takes no action for one instruction cycle. |

Additional instructions affect the operation of the fractional flag, setting and resetting its value, and perform an arithmetic shift operation. Alternatively, a master reset instruction can be provided to reset all registers and flags within a neuron to zero.

Additional bits for the reference vectors have been found from simulations to be necessary to ensure convergence when an arithmetic shifter mechanism is employed. For example, if the difference between the current weight value and the desired weight value is 15, and the gain $\alpha(t)$ is 0.0625 the weight value will not be updated if only 8 bits are used, however, if 12 bits are used the weight value will reach its target.

In the invention, each module comprises a neural network consisting of a array of at least one neural processing element (i.e., an array or neurons, for example 64 or 256) and a module controller.

Module Controller

Referring now to FIG. 12, a schematic representation is shown of a module controller 200 according to one embodiment of the invention. The module controller 200 performs several roles: its handle all device inputs and outputs, issues instructions to processing elements within a module, and synchronising the module operations.

In FIG. 12, a controller system according to one embodiment of the invention is illustrated. The controller system comprises input means 60, output means 60 (i.e., I/O ports 60, 62); memory means 64 containing instructions for the controller system and subroutines for the neural array; an address map 66 for conversion between real and virtual neuron addresses; an input buffer 68 to hold incoming data; and a number of handshake mechanisms 210, 220, 230. In FIG. 12, the memory means 64 comprises a programmable read-only-memory (PROM), however, RAM may be implemented in alternative embodiments of the invention.

The controller 200 handles all input for a module which includes start-up data during system configuration, the input vectors 16 bits (two vector elements) at a time during normal operation, and also the index of the active neuron 100a when configured in lateral expansion mode. Outputs from a module are also handled exclusively by the controller 200.

In one embodiment of the invention, the outputs are limited to 16 bit output. The output represents the information held by a neuron 100; for example, the virtual co-ordinates of the active neuron 100a during operation, the parameters of trained neurons 100 such as their reference vectors after training operations have been completed, and/or other information held by the neuron 100.

To enable the above data transfers, suitable data-bus means must be provided between the controller and the neural array. The suitable data-bus means may comprises a bi-directional data bus or, for example, two mono-directional bus means such that one carries input to the controller from the neural array and the other carries output from the controller to the neural array. The data-bus means enables the controller to address either individual processing elements or all processing elements simultaneously; there is no requirement to allow other groups of processing elements to be addressed but the bus must also carry data from individual processing elements to the controller.

Whereas in some embodiments of the invention modules are operate synchronously, for example when in lateral expansion mode, in other embodiments the modules operate asynchronously from each other. In such embodiments, it is necessary to synchronise data communication between modules by implementing a suitable handshake mechanism.

The handshake mechanism synchronises data transfer from a module transmitting the data (the sender) to a module receiving the data (the receiver). The handshake can be implemented by the module controllers of the sender and receiver modules, and in one embodiment requires three handshake lines. In this embodiment, therefore, the handshake system can be viewed as a state machine with only three possible states:

1) Wait (Not ready for input)
2) No Device (No input stream for this position)
3) Data Ready (Transfer data)

The handshake system is shown as a simple state diagram in FIG. 13. With reference to FIG. 13, the "Wait" state 70 occurs when either the sender or receiver (or both) are not ready for data transfer. The "No Device" state 72 is used to account for situations where inputs are not present so that reduced input vector sizes can be utilised. This mechanism could also be used to facilitate some fault tolerance when input streams are out of action so that the system did not come to a halt. The "Data Ready" state 74 occurs when both the sender and the receiver are ready to transfer data and, consequently, data transfer follows immediately this state is entered.

This handshake system makes it possible for a module to read input data in any sequence. When a data source is temporarily unavailable the delay can be minimised by processing all other input vector elements while waiting for that datum to become available. Thus in this embodiment of the invention, individual neurons can be instructed to process inputs in a different order. However, as the controller buffers input data there is no necessity for neurons to process data in the same order it is received.

Thus in this embodiment, the three possible conditions of the data transfer state machine are determined by two outputs from the sender module and one output from the receiving module.

The three line handshake mechanism allows the transfer of data direct to each other wherein no third party device is required, and data communication is maintained as point to point.

Data is output 16 bits at a time and as two 8 bit values can be output by the system, only a single data output cycle is required. The three line handshake mechanism is used to synchronise the transfer of data, so that three handshake connections are also required at the output of a module. The inputs are can be received from up to eight separate sources, each one requiring three handshake connections thereby giving a total of 24 handshake connections for the input data.

This mechanism requires 24 pins on the device but, internal multiplexing can enable the controller to use a single three line handshake mechanism internally to cater for all inputs.

In an alternative embodiment of the invention, to facilitate reading the co-ordinates for lateral expansion mode, a two line handshake system is used. The mechanism is similar to the three line handshake system, except the 'device not present' state is unnecessary and is therefore been omitted.

The module controller is also required to manage the operation of the processing elements, i.e., the neurons, on its module. To facilitate such control suitable memory means 64 are provided. As FIG. 12 illustrates, this may be a programmable read-only memory (ROM) 64 which holds subroutines of code for the neural array in addition to the instructions it holds for the controller, alternatively the memory may comprise Random Access Memory (RAM). If RAM is implemented, greater flexibility is provided to program the module for different applications.

In the embodiment of the invention illustrated in FIG. 12, the module controller contains a neural array instruction sub-system which is used to control the operations of the neural array and which has ROM to hold the module controller instructions. The Neural Array instructions are then embedded in these instructions.

The module controller also contains a collection of registers and a program counter as described herein. This provides the module controller with the ability to perform computation for calculating the current training step, gain factor, neighbourhood value and the ability to perform manipulation of incoming and outgoing data.

The memory means 64 of the controller may thus comprise RAM and/or PROM. The program is read from the memory means and passed to the neural array a single instruction at a time. Each instruction is executed immediately when received by individual neurons. When issuing these instructions the controller also forwards incoming data and processes outgoing data.

Several routines are provided to support full system functionality, to set up the system at start up time, and to output reference vector values etc. at shutdown. The start up and shutdown routines are very simple and only require data to be written to and read from registers using the RDI and OUT commands.

The four main routines are used in this embodiment of the invention. These calculate the Manhattan distance (calcdist); find the active neuron (findactive); determine which neurons are in the current neighbourhood (nbhood); and update the reference vectors (update). Each of these procedures will be detailed in turn.

The most frequently used routine (calcdist) is required to calculate the Manhattan distance for the current input. When an input vector is presented to the system it is broadcast to all neurons an element at a time, (i.e. each 8 bit value) by the controller. As neurons receive this data they calculate the distance between each input value and its corresponding weight value, adding the results to the distance register. The controller reads the routine from the program ROM, forwards it to the neural array and forwards the incoming data at the appropriate time. This subroutine is required for each vector element and will be as follows:

| | | |
|---|---|---|
| MOV | ($W_i$) register.*/ | /*Move weight ($W_i$) to the AIM input |
| SUB | ($X_i$) | /* Subtract the value at the ALU register from the next input.*/ |
| MOV | ($R_i$) register.*/ | /*Move the result ($R_i$) to the ALU input |
| BRN | | /*If the result was negative*/ |
| SUB | dist | /*distance = distance – $R_i$*/ |
| ADD | dist | /*Else distance = distance + $R_i$*/ |
| WRO | dist | /*Write the new distance to its register.*/ |

Once all inputs have been processed and neurons have calculated their respective Manhattan distances the active neuron needs to be identified. As the active neuron is simply the neuron with minimum distance and all neurons have the ability to make these calculations the workload can be spread across the network. This approach can be implemented by all neurons simultaneously subtracting one from their current distance value repeatedly until a neuron reaches a zero distance value, at which time the neuron passes data to the controller to notify it that it is the active neuron. Throughout this process the value to be subtracted from the distance is supplied to the neural array by the controller. On the first iteration this will be zero to check if any neuron has a match with the current input vector (i.e. distance is already zero) thereafter the value forwarded will be one. The subroutine findactive defines this process as follows:

| MOV | input | /*Move the input to the ALU input register.*/ |
|---|---|---|
| SUB | dist | /*Subtract the next input from the current distance value.*/ |
| BRZ | | /*If result is zero.*/ |
| OUT | ID | /*output the neuron ID.*/ |
| NOP | | /*Else do nothing.*/ |

On receiving an acknowledge signal from one of the neurons in the network, by way of its ID, the controller outputs the virtual co-ordinates of the active neuron. The controller uses a map (or lookup table) of these co-ordinates which are 16 bits so that neurons can pass only their local ID (8 bits) to the controller. The controller outputs the virtual co-ordinates of the active neuron immediately they become available. In a hierarchical embodiment of the invention, the output is required to be available as soon as possible for the next layer to begin processing the data, and in a laterally configured embodiment of the invention, the co-ordinates of the active neuron remain unknown until the co-ordinates have been supplied to the input port of the module.

When modules are connected together in a lateral manner, each module is required to output details of the active neuron for that device before reference vectors are updated because the active neuron for the whole network may not be the same as the active neuron for that particular module. When connected together in this way, modules are synchronised and the first module to respond is the one containing the active neuron for the whole network. Only the first module to respond will have its output forwarded to the inputs of all the modules constituting the network. Consequently, no module is able to proceed with updating reference vectors until the co-ordinates of the active neuron have been supplied via the input of the device because the information is not known until that time. When a module is in 'lateral mode' the two line handshake system is activated and after the co-ordinates of the active neuron have been supplied the output is reset and the co-ordinates broadcast to the neurons on that module.

When co-ordinates of the active neuron are broadcast, all neurons in the network determine if they are in the current neighbourhood by calculating the Manhattan distance between the active neurons virtual address and their own. If the result is less than or equal to the current neighbourhood value, the neuron will set its update flag so that it can update its reference vector at the next operational phase. The routine for this process (nbhood) is as follows:

| MOV | Xcoord | /*Move the virtual X co-ordinate to the ALU input register.*/ |
|---|---|---|
| SUB | input | /*Subtract the next input (X coord) from value at ALU.*/ |
| WRO | dist register. | /*Write the result to the distance |
| MOV | Ycoord ALU.*/ | /*Move the virtual Y co-ordinate the |
| SUB | input | /*Subtract the next input (Y coord) from value at ALU.*/ |
| MOV | dist | /*Move the value in distance register to ALU.*/ |
| ADD | result | /*Add the result of the previous arithmetic to the value at ALU input.*/ |
| MOV | result | /*Move the result of the previous arithmetic to the ALU input.*/ |

| SUB | input | /*Subtract the next input (neighbourhood val) from value at ALU.*/ |
|---|---|---|
| BRN | | /*If the result is negative.*/ |
| SUP | | /*Set the update flag.*/ |
| BRZ | | /*If the result is zero.*/ |
| SUP | | /*Set the update flag.*/ |
| NOP | | /*Else do nothing*/ |

All neurons in the current neighbourhood then go on to update their weight values. To achieve this they also have to recalculate the difference between input and weight elements, which is inefficient computationally as these values have already been calculated in the process of determining Manhattan distance. An alternative approach requires each neuron to store these intermediate values, thereby necessitating an additional memory for neuron (in this embodiment 16 bytes per neuron).

To minimise the use of hardware resources these intermediate values are recalculated during the update phase. To facilitate this the module controller stores the current input vector and is able to forward vector elements to the neural array as they are required. The update procedure is then executed for each vector element as follows:

| RDI | gain register.*/ | /*Read next input and place it in the gain |
|---|---|---|
| MOV | $W_i$ | /*Move weight value ($W_i$) to ALU input.*/ |
| SUB | input | /*Subtract the input from value at ALU*/ |
| MOV | result | /*Move the result to the ALU. */ |
| ADD | $W_i$ | /*Add weight value ($W_i$) to ALU input.*/ |
| BRU | | /*If the update flag is set.*/ |
| WRO | $W_i$ register.*/ | /*Write the result back to the weight |
| NOP | | /*Else do nothing.*/ |

After all neurons in the current neighbourhood have updated their reference vectors the module controller reads in the next input vector and the process is repeated. The process will then continue until the module has completed the requested number of training steps or an interrupt is received from the master controller.

The term 'master controller' is used to refer to any external computer system that is used to configure Modular Maps. A master controller is not required during normal operation as Modular Maps operate autonomously but may be required in some embodiments of the invention to supply the operating parameters and reference vector values at start up time, set the mode of operation and collect the network parameters after training is completed. In such embodiments, the module controller receives instructions from the master controller at these times. To enable this, modules have a three bit instruction interface exclusively for receiving input from the master controller. The instructions received are very basic and the total master controller instruction set only comprises six instructions which are as follows:

RESET: This is the master reset instruction and is used to clear all registers etc. in the controller and neural array LOAD: Instructs the controller to load in all the setup data for the neural array including details of the gain factor and neighbourhood parameters. The number of data items to be loaded is constant for all configurations and data are always read in the same sequence. To enable data to be read by the controller the normal data input port is used with a two line handshake (the same one used for lateral mode), which is identical to the three line handshake described earlier, except that the device present line is not used.

UNLOAD: Instructs the controller to output network parameters from a trained network. As with the LOAD instruction the same data items are always output in the same sequence. The data are output from the modules data output port.

NORMAL: This input instructs the controller to run in normal operational mode

LATERAL: This instructs the controller to run in lateral expansion mode. It is necessary to have this mode separate to normal operation because the module is required to read in co-ordinates of the active neuron before updating the neural arrays reference vectors and reset the output when these co-ordinates are received.

STOP: This is effectively an interrupt to advise the controller to cease its current operation.

In one embodiment of the invention, the number of neurons on a single module is small enough to enable implementation on a single device. The number of neurons is preferably a power of 2, for example, the network size which best suited the requirements of one embodiment of the invention is 256 neurons per module.

As the Modular Map design is intended for digital hardware there are a range of technologies available that could be used, e.g. full custom very large scale integration (VLSI), semi-custom VLSI, application specific integrated circuit (ASIC) or Field Programmable Gate Arrays (FPGA). A 256 neuron Modular Map constitutes a small neural network and the simplicity of the RISC neuron design leads to reduced hardware requirements compared to the traditional SOM neuron.

The Modular Map design maximises the potential for scalability by partitioning the workload in a modular fashion. Each module operates as a Single Instruction Stream Multiple Data stream (SIMD) computer system composed of RISC processing elements, with each RISC processor performing the functionality of a neuron These modules are self contained units that can operate as part of a multiple module configuration or work as stand alone systems.

The hardware resources required to implement a module can be minimised by modifying the original SOM algorithm. One modification is the replacement of the conventional Euclidean distance metric by the simpler and easier to implement Manhattan distance metric. The adoption of the Manhattan metric coupled with the 45° rotated-square step-function neighbourhood, enables each neuron to determine whether it is within the neighbourhood of the active neuron or not using an arithmetic shifter mechanism. Such modifications result in considerable savings of hardware resources because the modular map design does not require conventional multiplier units. The simplicity of this fully digital design is suitable for implementation using a variety of technologies such as VLSI or ASIC.

The Module and the Modular Map Structure

Referring now to FIG. 5, a schematic representation of a single Modular Map is illustrated. At start-up time the Modular Map needs to be configured with the correct parameter values for the intended arrangement. All the 8-bit weight values are loaded into the system at configuration time so that the system can have either random weight values or pre-trained values at start-up. The index of all individual neurons, which consist of two 8-bit values for the X and Y co-ordinates, are also selected at configuration time.

The flexibility offered by allowing this parameter to be set is perhaps more important for situations where several modules are combined, but still offers the ability to create a variety of network shapes for a stand alone situation. For example, a module could be configured as a one or two dimensional network. In addition to providing parameters for individual neurons at configuration time the parameters that apply to the whole network are also required (i.e. the number of training steps, the gain factor and neighbourhood start values). Intermediate values for the gain factor and neighbourhood size are then determined by the module itself during run time using standard algorithms which utilise the current training step and total number of training steps parameters.

After configuration is complete, the Modular Map enters its operational phase and data are input 16 Bits (i.e. two input vector elements) at a time. The handshake system controlling data input is designed in such a way as to allow for situations where only a subset of the maximum possible inputs is to be used. Due to tradeoffs between data input rates and flexibility the option to use only a subset of the number of possible inputs is restricted to even numbers (i.e. 14, 12, 10 etc). However, if only say 15 inputs are required then the 16th input element could be held constant for all inputs so that it does not affect the formation of the map during training. The main difference between the two approaches to reducing input dimensionality is that when the system is aware that inputs are not present it does not make any attempt to use their values to calculate the distance between the current input and the reference vectors within the network, thereby reducing the workload on all neurons and consequently reducing propagation time of the network.

After all inputs have been read by the Modular Map the active neuron is determined and its X,Y co-ordinates are output while the reference vectors are being updated. As the training process has the effect of creating a topological map (such that neural activations across the network have a meaningful order as though a feature co-ordinate system were defined over the network) the X,Y co-ordinates provide meaningful output. By feeding inputs to the map after training has been completed it is straightforward to derive an activation map which could then be used to assign labels to the outputs from the system.

As an example, in simplified embodiment of the invention, a Modular Map can be considered where only three dimensions are used as inputs. In such an example, a single map (such as FIG. 5 illustrates) could be able to represent an input space enclosed by a cube and each dimension would have a possible range of values between 0 and 255. With only the simplest of pre-processing this cube could be placed anywhere in the input space $\Re^n$ where $\Re$ covers the range ($-\infty$ to $+\infty$), and the reference vector of each neuron within the module would give the position of a point somewhere within this feature space. The implementation suggested would allow each vector element to hold integer values within the given scale, so there are a finite number of distinct points which can be represented within the cube (i.e. $256^3$). Each of the points given by the reference vectors has an 'elastic' sort of bond between itself and the point denoted by the reference vectors of neighbouring neurons so as to form an elastic net (FIG. 4).

FIGS. 4a to 4c shows a series of views of the elastic net when an input is presented to the network. The figures show the point position of reference vectors in three dimensional Euclidean space along with their elastic connections. For simplicity, reference vectors are initially positioned in the plane with z=0, the gain factor (t) is held constant at 0.5 and both orthogonal and plan views are shown. After the input has been presented, the network proceeds to update reference vectors of all neurons in the current neighbourhood. In FIG. 4*b*, the neighbourhood function has a value of three. In FIG. 4*c* the same input is presented to the network for a second time and the neighbourhood is reduced to two for this iteration. Note that the reference points around the active neuron become close together as if they were being pulled towards the input by elastic bonds between them.

Inputs are presented to the network in the form of multi-dimensional vectors denoting positions within the feature space. When an input is received, all neurons in the network calculate the similarity between their reference vectors and the input using the Manhattan distance metric. The neuron with minimum Manhattan distance between its reference vector and the current input, (i.e. greatest similarity) becomes the active neuron. The active neuron then proceeds to bring its reference vector closer to the input, thereby increasing their similarity. The extent of the change applied is proportional to the distance involved, this proportionality being determined by the gain factor $\alpha(t)$, a time dependent parameter.

However, not only does the active neuron update its reference vector, so too do all neurons in the current neighbourhood (i.e. neurons topographically close to the active neuron on the surface of the map up to some geometric distance defined by the neighbourhood function) as though points closely connected by the elastic net were being pulled towards the input by the active neuron. This sequence of events is repeated many times throughout the learning process as the training data is fed to the system. At the start of the learning process the elastic net is very flexible due to large neighbourhoods and gain factor, but as learning continues the net stiffens up as these parameters become smaller. This process causes neurons close together to form similar reference values.

During this learning phase, the reference vectors tend to approximate various distributions of input vectors with some sort of regularity and the resulting order always reflects properties of the probability density function $P(x)$ (i.e. the point density of the reference vectors becomes proportional to $[P(x)]^{1/3}$).

The reference vectors can be used to describe the density function of inputs, and local interactions between neurons tend to preserve continuity on the surface of the neural map. A combination of these opposing forces causes the vector distribution to approximate a smooth hyper-surface in the pattern space with optimal orientation and form that best imitates the overall structure of the input vector density.

This is done in such a way as to cause the map to identify the dimensions of the feature space with greatest variance which should be described in the map. The initial ordering of the map occurs quite quickly and is normally achieved within the first 10% of the training phase, but convergence on optimal reference vector values can take a considerable time. The trained network provides a non-linear projection of the probability density function $P(x)$ of the high-dimensional input data x onto a 2-dimensional surface (i.e. the surface of neurons).

FIG. 5 is a schematic representation of a single modular map. At start-up time the Modular Map needs to be configured with the correct parameter values for the intended arrangement. All the 8-bit weight values are loaded into the system at configuration time so that the system can have either random weight values or pre-trained values at start-up. The index of all individual neurons, which consist of two 8-bit values for the X and Y co-ordinates, are also selected at configuration time. The flexibility offered by allowing this parameter to be set is perhaps more important for situations where several modules are combined, but still offers the ability to create a variety of network shapes for a stand alone situation. For example, a module could be configured as a one or two dimensional network. In addition to providing parameters for individual neurons at configuration time the parameters that apply to the whole network are also required (i.e. the number of training steps, the gain factor and neighbourhood start values). Intermediate values for the gain factor and neighbourhood size are then determined by the module itself during run time using standard algorithms which utilise the current training step and total number of training steps parameters.

After configuration is complete, the Modular Map enters its operational phase and data are input 16 Bits (i.e. two input vector elements) at a time. The handshake system controlling data input is designed in such a way as to allow for situations where only a subset of the maximum possible inputs is to be used. Due to tradeoffs between data input rates and flexibility the option to use only a subset of the number of possible inputs is restricted to even numbers (i.e. 14, 12, 10 etc). However, if only say 15 inputs are required then the 16th input element could be held constant for all inputs so that it does not affect the formation of the map during training. The main difference between the two approaches to reducing input dimensionality is that when the system is aware that inputs are not present it does not make any attempt to use their values to calculate the distance between the current input and the reference vectors within the network, thereby reducing the workload on all neurons and consequently reducing propagation time of the network.

After all inputs have been read by the Modular Map the active neuron is determined and its X,Y co-ordinates are output while the reference vectors are being updated. As the training process has the effect of creating a topological map (such that neural activations across the network have a meaningful order as though a feature co-ordinate system were defined over the network) the X,Y co-ordinates provide meaningful output. By feeding inputs to the map after training has been completed it is straightforward to derive an activation map which could then be used to assign labels to the outputs from the system.

Lateral Maps

As many difficult tasks require large numbers of neurons the Modular Map has been designed to enable the creation of networks with up to 65,536 neurons on a single plane by allowing lateral expansion. Each module consists of, for example, 256 neurons and consequently this is the building block size for the lateral expansion of networks. Each individual neuron can be configured to be at any position on a 2-dimensional array measuring up to $256^2$ but networks should ideally be expanded in a regular manner so as to create rectangular arrays. The individual neuron does in fact have two separate addresses; one is fixed and refers to the neuron's location on the device and is only used locally; the other, a virtual address, refers to the neuron's location in the network and is set by the user at configuration time. The virtual address is accommodated by two 8-bit values denoting the X and Y co-ordinates; it is these co-ordinates that are broadcast when the active neuron on a module has been identified.

When modules are connected together in a lateral configuration, each module receives the same input vector. To simplify the data input phase it is desirable that the data be made available only once for the whole configuration of modules, as though only one module were present. To facilitate this all modules in the configuration are synchronised so that they act as a single entity. The mechanism used to ensure this synchronism is the data input handshake mechanism.

The Modular Map has been designed to enable the creation of networks with up to 65,536 neurons on a single plane by allowing lateral expansion. Each module consists of, for example, 256 neurons and consequently this is the building block size for the lateral expansion of networks. Each individual neuron can be configured to be at any position on a 2-dimensional array measuring up to $256^2$ but networks should ideally be expanded in a regular manner so as to create rectangular arrays. The individual neuron does in fact have two separate addresses; one is fixed and refers to the neuron's location on the device and is only used locally; the other, a virtual address, refers to the neuron's location in the network and is set by the user at configuration time. The virtual address is accommodated by two 8-bit values denoting the X and Y co-ordinates; it is these co-ordinates that are broadcast when the active neuron on a module has been identified.

When modules are connected together in a lateral configuration, each module receives the same input vector. To simplify the data input phase it is desirable that the data be made available only once for the whole configuration of modules, as though only one module were present. To facilitate this all modules in the configuration are synchronised so that they act as a single entity. The mechanism used to ensure this synchronism is the data input handshake mechanism. By arranging the input data bus for lateral configurations to be inoperative until all modules are ready to accept input, the modules will be synchronised. All the modules perform the same functionality simultaneously, so they can remain in synchronisation once it has been established, but after every cycle new data is required and the synchronisation will be reinforced.

When connected in a lateral configuration, such as FIG. 6 illustrates all modules calculate the local 'winner' (i.e., the active neuron) by using all neurons on the module to simultaneously subtract one from their calculated distance value until a neuron reaches a value of zero. The first neuron to reach a distance of zero is the one that initially had the minimum distance value and is therefore the active neuron for that module. The virtual co-ordinates of this neuron are then output from the module, but because all modules are synchronised, the first module to attempt to output data is also the module containing the 'global winner' (i.e. the active neuron for the whole network). The index of the 'global winner' is then passed to all modules in the configuration. When a module receives this data it supplies it to all its constituent neurons. Once a neuron receives this index it is then able to determine if it is in the current neighbourhood in exactly the same way as if it were part of a stand alone module.

Arbitration logic is provided to ensure that only one 'global winner' is selected across the entire neural array. The arbitration logic may, for example, be a binary tree. The arbitration logic may be provided on each neuron in such a manner that it can work across the entire neural array independent of the network topology (i.e., the module topology). Alternatively, additional logic external to modules may be provided.

The arbitration logic ensures that only the index which is output from the first module to respond is forwarded to the modules in the configuration (see FIG. 6). In FIG. 6, logic block A accepts as inputs the data ready line from each module in the network. The first module to set this line contains the "global winner" for the network. When the logic receives this signal it is passed to the device ready input which forms part of the two line handshake used by all modules in lateral expansion mode. When all modules have responded to the effect that they are ready to accept the co-ordinates of the active neuron the module with these co-ordinates is requested by logic block A to send the data. When modules are connected in this lateral manner they work in synchronisation, and act as though they were a single module which then allows them to be further combined with other modules to form larger networks.

Once a network has been created in this way it acts as though it were a stand alone modular map and can be used in conjunction with other modules to create a wide range of network configurations. However, it should be noted that as network size increases the number of training steps also increases because the number of training steps required is proportional to the network size which suggests that maps are best kept to a moderate size whenever possible.

FIG. 7 shows an example of a hierarchical network, with four modules 10, 12, 14, 16 on the input layer I. The output from each of the modules 12, 14, 16, 18 on the input layer I is connected to the input of an output module 18 on the output layer O. Each of the modules 10, 12, 14, 16, 18 has a 16 bit input data bus, and the modules 10, 12, 14, 16 on the input layer I have 24 handshake lines connected as inputs to facilitate data transfer between them, as will be described hereinafter. The output module 18 has 12 handshake lines connected as inputs, three handshake lines from each of the modules 10, 12, 14, 16 in the input layer I.

In one embodiment of the invention, each Modular Map is limited to a maximum of 16 inputs, and a mechanism is provided to enable these maps to accept larger input vectors so they may be applied to a wide range of problem domains. Larger input vectors are accommodated by connecting together a number of Modular Maps in a hierarchical manner and partitioning the input data across modules at the base of the hierarchy. Each module in the hierarchy is able to accept up to 16 inputs, and outputs the X,Y co-ordinates of the active neuron for any given input; consequently there is a fan-in of eight modules to one which means that a single layer in such a hierarchy will accept vectors containing up to 128 inputs. By increasing the number of layers in the hierarchy the number of inputs which can be catered for also increases (i.e. Max Number of inputs=$2*8^n$ where n=number of layers in hierarchy). From this simple equation it is apparent that very large inputs can be catered for with very few layers in the hierarchy.

By building hierarchical configurations of Modular Maps to cater for large input vectors the system is in effect parallelising the workload among many processing elements. As the input vector size increases, the workload on individual neurons also increases, which can lead to considerable increases in propagation delay through the network. The hierarchical configurations keep the workload on individual neurons almost constant, with increasing workloads being met by an increase in neurons used to do the work.

To facilitate hierarchical configurations of modular maps, communication between modules must be efficient to avoid bottleneck formation. The invention provides suitable bus means to connect the outputs of a plurality of modules (for example, eight modules) to the input of a single module on the next layer of the hierarchy (see FIG. 7).

Data collision is avoided by providing sequence control, for example, synchronising means. Each Modular Map has a suitable handshake mechanism, for example, in the embodiment illustrated in FIG. 7, the module has 16 input data lines plus three lines for each 16 bit input (two vector elements), i.e. 24 handshake lines which corresponds to a maximum of eight input devices. Consequently, each module also has a three bit handshake and 16 bit data output to facilitate the interface scheme. One handshake line advises the receiving module that the sender is present; one line advises it that the sender is ready to transmit data; and the third line advises the sender that it should transmit the data. After the handshake is complete the sender will then place its data on the bus to be read by the receiver. The simplicity of this approach negates the need for additional interconnect hardware and thereby keeps to a minimum the communication overhead. However, the limiting factor with regard to these hierarchies and their speed of operation is that each stage in the hierarchy cannot be processed faster than the slowest element at that level.

In some embodiments of the invention, however, the modules could complete their classification at differing rates which could affect operational speed. For example, one module may be required to have greater than the 256 neurons available to a single Modular Map and would be made up of several maps connected together in a lateral type of configuration (as described above) which would slightly increase the time required to determine its activations, or perhaps a module has less than its maximum number of inputs thereby reducing its time to determine activations. It should also be noted that under normal circumstances (i.e. when all modules are of equal configurations) that the processing time at all layers in the hierarchy will be the same as all modules are carrying out equal amounts of work; this has the effect of creating a pipelining effect such that throughput is maintained constant even when propagation time through the system is dependent on the number of layers in the hierarchy.

In this embodiment, as each Modular Map is capable of accepting a maximum of 16 inputs and generates only a 2-dimensional output, there is a dimensional compression ratio of 8:1 which offers a mechanism to fuse together many inputs in a way that preserves the essence of the features represented by those inputs with regard to the metric being used.

In one embodiment of the invention, a Modular Map containing 64 neurons configured in a square array with neurons equally spaced within a 2-D plane measuring $256^2$ was trained on 2000 data points randomly selected from two circular regions within the input space of the same dimensions (see FIG. 8). The trained network formed regions of activation shown as a Voronoi diagram in FIG. 9.

From the map shown in FIG. 9 it is clear that the point positions of reference vectors (shown as black dots) are much closer together (i.e. have a higher concentration) around regions of the input space with a high probability of containing inputs. It is also apparent that, although a simple distance metric (Manhattan distance) is being used by neurons, the regions of activation can have some interesting shapes.

It should also be noted that the formation of regions at the outskirts of the feature space associated with the training data are often quite large and suggest that further inputs to the trained system considerably outwith the normal distribution of the training data can lead to spurious neuron activations. In this example, three neurons of the trained network had no activations at all for the data used, the reference vector positions of these three neurons (marked on the Voronoi diagram of FIG. 9 by *) fall between the two clusters shown and act as a divider between the two classes.

The trained network detailed in FIG. 9 was used to provide several inputs to another network of the same configuration (except the number of inputs) in a way that mimicked a four into one hierarchy (i.e. four networks on the first layer, one on the second). After the module at the highest level in the hierarchy had been trained, it was found that the regions of activation for the original input space were as shown in FIG. 10.

Comparison between FIGS. 9 and 10 shows that the same regional shapes have been maintained exactly, except that some regions have been merged together, showing that complicated non-linear regions can be generated in this way without affecting the integrity of classification. It can also be seen that the regions of activation being merged together are normally situated where there is a low probability of inputs so as to make more efficient use of the resources available and provide some form of compression. The apparent anomaly see in FIG. 10 arises because the activation regions of the three neurons of the first network, which are inactive after training, have not been merged together. This region of inactivity is formed naturally between the two clusters during training due to the 'elastic net' effect outlined earlier and is consequently unaffected by the merging of regions. This combining of regions has also increased the number of inactive neurons to eight for the second layer network. The processes highlighted apply to higher dimensional data. Suitable hierarchical configurations of the Modular Map can thus provide a mechanism for partitioning the workload of large input vectors, and allow a basis for data fusion of a range of data types, from different sources and input at different stages in the hierarchy.

By connecting modules together in a hierarchical manner, input data can be partitioned in a variety of ways. For example, the original high dimensional input data can be split into vectors of 16 inputs or less, i.e. for an original feature space $\Re^n$, n can be partitioned into groups of 16 or less. When data is partitioned in this way, each module forms a map of its respective input domain. There is no overlap of maps, and a module has no interaction with other modules on its level in the hierarchy.

Alternatively, inputs to the system can span more than one module, thereby enabling some data overlap between modules, which assists modules in their classification by providing them with some sort of context for the inputs. This is also a mechanism which allows the feature space to be viewed from a range of perspectives with the similarity between views being determined by the extent of the data overlap.

Simulations have also shown that an overlap of inputs (i.e. feeding some inputs to two or more separate modules) can lead to an improved mapping and classification.

Partitioning can provide a better representation for the range of values in a dimension; i.e. $\Re$ could be partitioned. Partitioning a single dimension of the feature space across several inputs should not normally be required, but if the reduced range of 256 which is available to the Modular Map should prove to be too restrictive for an application, then the flexibility of the Modular Map is able to support such a partitioning approach. The range of values supported by the Modular Map inputs should be sufficient to capture the essence of any single dimension of the feature space, but pre-processing is normally required to get the best out of the system.

A balance can be achieved between the precision of vector elements, the reference vector size and the processing capabilities of individual neurons to gain the best results for minimum resources. The potential speedup of implementing all neurons in parallel is maximised in one embodiment of the invention by storing reference vectors local to their respective neurons (i.e. on chip as local registers). To further support maximum data throughput simple but effective parallel point to point communications are utilised between modules. This Modular Map design offers a fully digital parallel implementation of the SOM that is scaleable and results in a simple solution to a complex problem.

One of the objectives of implementing Artificial Neural Networks (ANNs) in hardware is to reduce processing time for these computationally intensive systems. During normal operation of ANNs significant computation is required to process each data input. Some applications use large input vectors, sometimes containing data from a number of sources and require these large amounts of data processed frequently. It may even be that an application requires reference vectors updated during normal operation to provide an adaptive solution, but the most computationally intensive and time consuming phase of operation is network training. Some hardware ANN implementations, such as those for the multi-layer perceptron, do not implement training as part of their operation, thereby minimising the advantage of hardware implementation. However, Modular Maps do implement the learning phase of operation and, in so doing, maximise the potential benefits of hardware implementation. Consequently, consideration of the time required to train these networks is appropriate.

The Modular Map and SOM algorithms have the same basic phases of operation, as depicted in the flowchart of FIG. 14. When considering an implementation strategy in terms of partitioning the workload of the algorithm and employing various scales of parallelism, the potential speedup of these approaches should be considered in order to minimise network training time. Of the five operational phases shown in FIG. 14, only two are computationally intensive and therefore significantly affected by varying system parallelism. These two phases of operation involve the calculation of distances between the current input and the reference vectors of all neurons constituting the network, and updating the reference vectors of all neurons in the neighbourhood of the active neuron (i.e. phases 2 and 5 in FIG. 14).

Partitioning $\Re$ is not as simple as partitioning n, and would require a little more pre-processing of input data, but the approach could not be said to be overly complex. However, when partitioning $\Re$, only one of the inputs used to represent each of the feature space dimensions will contain input stimuli for each input pattern presented to the system. Consequently, it is necessary to have a suitable mechanism to cater for this eventuality, and the possible solutions are to either set the system input to the min or max value depending on which side of the domain of this input the actual input stimuli is on, or do not use an input at all if it does not contain active input stimuli.

The design of the Modular Map is of such flexibility that inputs could be partitioned across the network system in some interesting ways, e.g. inputs could be taken directly to any level in the hierarchy. Similarly, outputs can also be taken from any module in the hierarchy, which may be useful for merging or extracting different information types. There is no compulsion to maintain symmetry within a hierarchy which could lead to some novel configurations, and consequently separate configurations could be used for specific functionality and combined with other modules and inputs to form systems with increasing complexity of functionality. It is also possible to introduce feedback into Modular Map systems which may enable the creation of some interesting modular architectures and expand possible functionality.

It may be possible to facilitate dynamically changing context dependent pathways within Modular Map systems by utilising feedback and the concepts of excitory and inhibitory neurons as found in nature. This prospect exists because the interface of a Modular Map allows for the processing of only part of the input vector, and supports the possibility of a module being disabled. The logic for such inhibitory systems would be external to the modules themselves, but could greatly increase the flexibility of the system. Such inhibition could be utilised in several ways to facilitate different functionality, e.g. either some inputs or the output of a module could be inhibited. If insufficient inputs were available a module or indeed a whole neural pathway could be disabled for a single iteration, or if the output of a module were to be within a specific range then parts of the system could be inhibited. Clearly, the concept of an excitory neuron would be the inverse of the above with parts of the system only being active under specific circumstances.

Training Times

Kohonen states that the number of training steps required to train a single network is proportional to network size. So let the number of training steps (s) be equal to the product of the proportionality constant (k) and the network size (N) (i.e. Number of training steps required (s)=kN). From this simplified mathematical model it can be seen that the total training time ($T_{par}$) will be the product of the number of training steps required (s), the time required to process each input vector (d), and the time required to update each reference vector (d) i.e. Total training time ($T_{par}$)=2ds (seconds), but d=$nt_d$ and s=kN, so substituting and rearranging gives:

$$T_{par}=2Nnkt_d \qquad \text{Equation 1.1}$$

This simplified model is suitable for assessing trends in training times and shows that the total training time will be proportional to the product of the network size and the vector size, but the main objective is to assess relative training times.

In order to assess relative training times consider two separate implementations with identical parameters, excepting that different vector sizes, or network sizes, are used between the two systems such that vector size $n_2$ is some multiple (y) of vector size $n_1$.

If $T_1=2Nn_1 kt_d$ and $T_2=2Nn_2 kt_d$, then by rearranging the equation for $T_1$, $n_1=T_1/(2Nkt_d)$ but, $n_2=yn_1=y(T_1/(2Nktd))$. By substituting this result into the above equation for $T_2$ it follows that:

$$T_2=2N\,y\,(T_1/(2Nkt_d))\,kt_d=yT_1 \qquad \text{Equation 1.2}$$

The consequence of this simple analysis is that a module containing simple neurons with small reference vectors will train faster than a network of more complex neurons with larger reference vectors. This analysis can also be applied to changes in network size where it shows that training time will increase with increasing network size. Consequently, to minimise training times both networks and reference vectors should be kept to a minimum as is done with the Modular Map.

This model can be further expanded to consider hierarchical configurations of Modular Maps. One of the advantages of building a hierarchy of modules is that large input vectors can be catered for without significantly increasing the system training time.

In an embodiment of the invention with a hierarchical modular structure, the training time is the total training time for one layer plus the propagation delays of all the others. The propagation delay of a module ($T_{prop}$) is very small compared to its training time and is approximately equal to the time taken for all neurons to calculate the distance between their input and reference vectors. This delay is kept to a minimum because a module makes its output available as soon as the active neuron has been determined, and before reference vectors are updated. A consequence of this type of configuration is that a pipelining effect is created with each successive layer in the hierarchy processing data derived from the last input of the previous layer.

$$T_{prop} = nt_d \qquad \text{Equation 1.3}$$

All modules forming a single layer in the hierarchy are operating in parallel and a consequence of this parallelism is that the training time for each layer is equal to the training time for a single module. When several modules form such a layer in a hierarchy the training time will be dictated by the slowest module at that level which will be the module with the largest input vector (assuming no modules are connected laterally).

In this embodiment of the invention, a single Modular Map has a maximum input vector size of 16 elements and under most circumstances at least one module on a layer will use the maximum vector size available, then the vector size for all modules in a hierarchy ($n_h$) can be assumed to be 16 for the purposes of this timing model. In addition, each module outputs only a 2-dimensional result which creates an 8:1 data compression ratio so the maximum input vector size catered for by a hierarchical Modular Map configuration will be $2 \times 8^l$ (where l is the number of layers in the hierarchy). Consequently, large input vectors can be accommodated with very few layers in a hierarchical configuration and the propagation delay introduced by these layers will, in most cases, be negligible. It then follows that the total training time for a hierarchy ($T_h$) will be:

$$T_h = 2Nn_h kt_d + (l-1)n_h t_d \approx 2Nn_h kt_d \qquad \text{Equation 1.4}$$

By following a similar derivation to that used for equation 1.2 it can be seen that:

$$T_{par} \approx yT_h \qquad \text{Equation 1.5}$$

Where the scaling factor $y = n/n_h$.

This modular approach meets an increased workload with an increase in resources and parallelism which results in reduced training times compared to the equivalent unitary network and, this difference in training times is proportional to the scaling factor between the vector sizes (i.e. y).

FIG. 15 is a graph of the activation values (Manhattan distances) of the active neuron for the first 100 training steps in an exemplary neural networking application.

The data was generated for a 64 neuron Modular Map with 16 inputs using a starting neighbourhood covering 80% of the network. The first few iterations of the training phase (less than 10) has a high value for distances as can be seen from FIG. 15. However, after the first 10 iterations there is little variation for the distances between the reference vector of the active neuron and the current input. Thus, the average activation value after this initial period is only 10, which would require only 10 subtraction operations to find the active neuron. Consequently, although there is a substantial overhead for the first few iterations, this will be similar for all networks and can be regarded as a fixed overhead. Throughout the rest of the training phase the overhead of calculating the active neuron is relatively insubstantial.

During the training phase of operation, reference vectors are updated after the distances between the current input and the reference vectors of all neurons have been calculated. This process again involves the calculation of differences between vector elements as detailed above. Computationally this is inefficient because these values have already been calculated during the last operational phase. These differences may be stored in suitable memory means in alternative embodiments of the invention, however, in this embodiment, these values are recalculated.

After the distance between each element has been calculated these intermediate results are then multiplied by the gain factor. The multiplication phase is carried out by an arithmetic shifter mechanism which is placed within the data stream and therefore does not require any significant additional overhead (see FIG. 11). The addition of these values to the current reference vector affects the update time for a neuron approximately equivalent to the original summation operation carried out to determine the differences between input and reference vectors. Consequently, the time taken for a neuron to update its reference vector is approximately equal to the time it takes to calculate the distance, i.e. d (seconds), because the processes involved are the same (i.e. difference calculations and addition).

The number of neurons to have their reference vectors updated in this way varies throughout the training period, often starting with approximately 80% of the network and reducing to only one by the end of training. However, the time a Modular Map takes to update a single neuron will be the same as it requires to update all its neurons because the operations of each neuron are carried out in parallel.

In general, according to one embodiment of the invention, when a neuron is presented with an input vector it proceeds to calculate the distance between its reference vector and the current input vector using a suitable distance metric, for example, the Manhattan distance.

If the differences between vector elements are calculated in sequence, and consequently, when n dimensional vectors are used, n separate calculations are required. The time required by a neuron to determine the distance for one dimension is $t_d$ seconds, thus for n dimensions the total time to calculate the distance between input and reference vectors (d) will be $nt_d$ seconds; i.e.

$$d = nt_d \text{ (seconds)}.$$

The summation operation is carried out as the distance between each element is determined and is therefore a variable overhead dependent on the number of vector elements, and does not affect the above equation for distance calculation time. The value for $t_d$ has no direct relationship to the time an addition or subtraction operation will take for any particular device; it is the time required to calculate the distance for a single element of a reference vector including all variable overheads associated with this operation.

Thus if all neurons are implemented in parallel, the total time required for all neurons to calculate the distance will be equal to the time it takes for a single neuron to calculate its distance. Once neurons have calculated their distances the active neuron has to be identified before any further operations can be carried out which involves all neurons simultaneously subtracting one from their current distance value until one neuron reaches a value of zero. This identifies the active neuron (the neuron with minimum distance).

The vast majority of ANN implementations have been in the form of simulations on traditional serial computer systems which effectively offer the worst of both worlds because a parallel system is being implemented on a serial computer. As an approach to assessing the speedup afforded by parallel implementation the above timing model can be modified. In addition, the validity of this model can be assessed by comparing predicted relative training times with actual training times for a serial implementation of the Modular Map.

The main difference between parallel and serial implementation of the Modular Map is that the functionality of each neuron in a serial implementation is processed in turn which will result in a significant increase in the time required to calculate the Manhattan distances for all neurons in the network compared to a parallel implementation. As the operations of neurons are processed in turn there will also be a difference between the time required to calculate Manhattan distances and update reference vectors. The reason for this disparity with serial implementation is that only a subset of neurons in the network have their reference vectors updated, which will clearly take less time than updating all neurons constituting the network when each reference vector is updated in turn.

The number of neurons to have their reference vectors updated varies throughout the training period, for example, it may start with 80% and reduces to only one by the end of training. As this parameter varies with time it is difficult to incorporate into a timing model, but as the neighbourhood size is decreasing in a regular manner the average neighbourhood size over the whole training period covers approximately 40% of the network. The time required to update each reference vector is approximately equal to the time required to calculate the distance for each reference vector, and consequently the time spent updating reference vectors for a serial implementation will average 40% of the time spent calculating distances.

In order to maintain simplicity of this model, the workload of updating reference vectors will be evenly distributed among all neurons in the network and, consequently, the time required for a neuron to update its reference vectors will be 40% of the time required for it to calculate the Manhattan distance, i.e. update time=0.4 d (seconds).

In this case equation 1.1 becomes:

$$T_{serial} = 1.4\, N^2\, nkt_d \text{ (seconds)} \qquad \text{Equation 1.6}$$

This equation clearly shows that for serial implementation the training time will increase in proportion to the square of the network size. Consequently, the training time for serial implementation will be substantially greater than for parallel implementation. Furthermore, comparison of equation 1.1 and 1.6 shows that $T_{serial} = 0.7 N T_{par}$, i.e. the difference in training time for serial and parallel implementation will be proportional to the network size.

In the Modular Map hierarchy data compression is performed by successive layers in the hierarchy and results in a situation where fewer neurons are required in the output network of a hierarchy of Modular Maps than are required by a single SOM for the same problem. In addition, Modular Maps can be combined both laterally and hierarchically to provide the architecture suitable for numerous applications.

One application of the invention is to use a Modular Map neural network to classify face data. The Modular Maps can be combined in different ways and use different data partitioning strategies.

In another example of an application of a simple Modular Map neural network according to an embodiment of the invention, ground anchorage data can be used to illustrate that Modular Map hierarchies give improvements in classification and clustering moving up the hierarchy compared to conventional SOMs.

The Modular Map approach to face recognition results in a hierarchical modular architecture which utilises a 'data overlap' approach to data partitioning. When compared to the SOM solution for the face recognition problem, Modular Maps offer better classification results. When hierarchical configurations of Modular Maps are created, the classification at the output layer offers an improvement over that of the SOM because the clusters of activations are more compact and better defined for modular hierarchies. This clustering and classification improves moving up through successive layers in a modular hierarchy such that higher layers, i.e. layers closer to the output, effectively perform higher, or more complex, functionality.

The modular approach of the invention results in more neurons being used than would be required for the standard SOM. However, the RISC neurons used by Modular Maps require considerably less resources than the more complex neurons used by the SOM. The Modular Map approach is also scaleable such that arbitrary sized networks can be created whereas many factors impose limitations on the size of monolithic neural networks. In addition, as the number of neurons in a modular hierarchy increases, so does the parallelism of the system such that an increase in workload is met by an increase in resources to do the work. Consequently, network training time will be kept to a minimum and this will be less than would be required by the equivalent SOM solution, with the savings in training time for the Modular Map increasing with increasing workload.

One embodiment of the invention comprises a chip including at least one module and comprising the following specifications:

a programmable SIMD array architecture;
    a modular map or SOM algorithm implementation;
    256 neurons per device;
    16 dimension vector size;
    8 bit precision;
    on chip learning;
    fully digital CMOS implementation;
    3.3V power input;
    operating temperature range of 0° C. to 75° C.;
    2 Watt power dissipation;
    68 pin LCC packaging;
    clock speeds of 50 MHz or 100 MHz.

The 50 MHz implementation has an average propagation delay ($T_{prop}$) of 3.5 µsec, an operating performance of 1.2 GCPS and 0.675 GCUPS, 13 GIPS equivalent instructions per second and an average training time of 0.9 seconds.

The 100 MHz implementation has an average propagation delay ($T_{prop}$) of 1.75 µsec, an operating performance of 2.4 GCPS and 1.35 GCUPS, 26 GIPS equivalent instructions per second and an average training time of 0.45 seconds.

The expansion capabilities included up to 65,536 neurons per single neural array in laterally expanded embodiments of the invention. For example, with 65,536 neurons, the operating performance could be 300 GCPS, 154 GCUPS, and the training time within 4 hours, for example 3 hours 45 minutes with $T_{prop}$=3.5 µsec. For laterally expanded embodiments with 1,024 neurons, the operating performance could be 4.8 GCPS, 2.7 GCUPS, and the training time within 4 minutes, for example 3.5 minutes, and $T_{prop}$=3.5 µsec.

The preferred network expansion mode is by way of a hierarchical configuration using sub-space classification, which results in an almost constant training time irrespective of the number of neurons. No maximum neural size is then imposed, or input vector size limit applied.

In a hierarchical embodiment of the invention having a two-layer hierarchy, a 2,304 neuron array would have a maximum input vector dimension of 24. The hierarchy operating performance would be 10.8 GCPS, 6 GCUPS with a training time of 0.9 seconds and propagation delay $T_{prop}$ of 7 µsec.

In an alternative hierarchical embodiment of the invention having a four-layer hierarchy with 149,760 neurons, the maximum input vector dimension would be 8,192. The hierarchy operating performance would be 702 GCPS, 395 GCUPS with a training time of 0.9 seconds and propagation delay $T_{prop}$ of 14 µsec.

Asymmetrical hierarchical structures can also be implemented by the invention. Other clock speeds can also be implemented in alternative embodiments of the invention.

Modifications and improvements may be made to the foregoing without departing from the scope of the present invention. Although the above description and Appendix AA, which forms part of the specification, describe the preferred forms of the invention as implemented in special hardware, the invention is not limited to such forms. The modular map and hierarchical structure can equally be implemented in software, as by a software emulation of the circuits described above.

Appendix AA forms part of this specification.

Appendix A

Sample Activation Maps

The activation maps presented in this appendix were derived from the application of human face recognition detailed in chapter 7. This application had 27 separate classes, i.e. there were pictures of 27 humans. Each square on the activation map represents a single neuron. When a neuron has activations for a particular class, the class number is denoted. Where no class number is denoted the neuron is not associated with any class, i.e. it has no activations.

FIG. A.1: Example activation map for a 256 neuron SOM trained on eigenface data

| 4  |    |    | 15 | 15 | 15 | 11 | 16 | 16 |    |    |    |    | 13 | 13 |
|----|----|----|----|----|----|----|----|----|----|----|----|----|----|----|
| 4  | 4  |    | 15 |    |    | 11 | 11 | 16 |    |    |    | 13 | 13 | 13 |
| 4  | 6  | 6  |    |    |    |    | 23 | 23 | 10 | 10 |    | 13 |    |    |
| 4  |    | 6  | 6  |    |    |    | 23 |    | 10 | 10 |    | 12 |    | 21 |
|    | 6  | 6  |    | 9  | 9  | 9  | 23 | 10 |    | 12 |    | 12 | 21 | 21 |
| 5  |    | 19 | 19 |    |    | 9  |    | 2  | 2  |    | 12 |    |    | 21 |
| 5  | 5  | 5  |    | 19 | 25 |    | 25 |    | 2  |    |    |    | 21 | 21 |
| 20 | 20 |    |    |    |    | 25 |    | 12 | 12 | 2  | 2  | 7  | 7  | 7  |
| 1  | 18 |    | 18 |    |    | 15 |    | 12 |    |    |    | 7  | 26 |    |
| 1  | 1  | 18 |    | 18 | 18 | 15 |    | 14 | 14 |    | 14 |    | 26 |    |
| 27 | 27 | 1  | 1  | 18 |    | 15 |    | 14 | 14 | 14 | 14 |    | 26 | 19 |
| 27 | 27 | 18 | 18 | 16 | 16 | 11 |    |    |    |    |    | 26 | 26 | 19 |
| 20 | 22 | 22 | 22 | 16 |    |    | 11 |    | 17 |    |    |    | 26 | 19 | 24 |
| 20 |    | 22 | 3  |    | 11 | 11 |    | 17 |    |    |    | 8  |    |    | 24 |
|    |    | 9  |    | 3  |    |    |    | 17 | 17 | 8  |    | 8  | 7  | 7  | 24 |
| 9  | 9  | 9  |    | 3  | 3  | 3  | 17 | 17 |    |    |    | 8  | 8  | 7  |    | 24 |

FIG A.2: Example activation map for a Modular Map Hierarchy (Configuration 4) trained on eigenface data

| 24 |    |    |    | 3  |    |    |    | 21 |    | 21 |    |    | 4  | 4  |    |
|----|----|----|----|----|----|----|----|----|----|----|----|----|----|----|----|
|    |    |    |    | 3  | 3  |    |    |    | 21 |    |    | 4  | 4  |    |    |
|    |    |    |    |    |    |    | 7  |    | 7  |    |    | 4  |    |    |    |
| 26 |    |    |    |    | 11 |    |    | 7  |    | 7  |    |    |    |    | 6  |
|    | 26 |    |    | 11 |    | 11 |    | 17 | 17 |    | 8  |    |    |    | 6  |
| 19 | 26 | 26 |    |    | 12 |    | 13 | 13 |    | 17 |    |    | 8  | 6  |    |
| 19 |    |    |    | 14 | 12 | 13 | 13 |    | 17 |    |    | 8  |    | 6  | 6  |
|    |    |    | 14 | 14 |    |    |    | 13 |    | 17 |    |    |    |    |    |
|    |    |    | 14 | 14 |    |    |    |    |    |    | 12 |    |    |    |    |
|    |    |    | 14 | 14 |    |    |    |    |    | 12 |    | 12 | 15 |    |    |
|    |    | 22 | 22 | 22 |    |    |    |    | 5  | 5  | 5  | 15 | 15 |    |    |

FIG A.2: Example activation map for a Modular Map Hierarchy (Configuration 4) trained on eigenface data

|   |    |    |    |    |    |    | 11 |    | 5  |    | 15 |    |    |    |
|---|----|----|----|----|----|----|----|----|----|----|----|----|----|----|
| 1 |    |    | 25 | 27 | 27 | 27 | 27 |    | 11 |    |    | 2  | 20 |    |
| 1 |    |    | 25 | 9  |    |    | 19 | 23 |    |    | 2  | 2  | 2  | 20 | 20 |
|   | 1  | 1  | 18 |    | 9  |    | 19 | 23 | 23 |    |    |    | 2  | 20 |
|   |    | 18 | 18 | 18 | 9  | 9  |    | 16 |    |    | 23 | 10 | 10 |    |
|   | 18 |    | 18 |    |    |    |    | 16 | 16 |    |    | 10 | 10 | 10 |

The invention claimed is:

1. A neural processing element adapted to be used in a neural network, the processing element comprising:
   arithmetic logic means;
   an arithmetic shifter mechanism;
   data multiplexing means;
   memory means;
   data input means including at least one input port;
   data output means including at least one output port; and
   control logic means;
   the neural processing element being adapted to perform operations on a reference vector consisting of weight values;
   characterized in that said weight values are of different bit-sizes during different phases of neural operation.

2. The neural processing element as claimed in claim 1, wherein each neural processing element is a single neuron in the neural network.

3. The neural processing element as claimed in claim 1, further including data bit-size indicator means.

4. The neural processing element as claimed claim 3, wherein the data bit-size indicator means enables operations on different bit-size data values to be executed using the same instruction set.

5. The neural processing element as claimed in claim 1, further including at least one register means.

6. The neural processing element as claimed in claim 5, wherein the register means operates on different bit-size data in accordance with said data bit-size indicator means.

7. A neural network module comprising an array of neural processing elements as claimed in claim 1; and at least one neural network controller for controlling the operation of at least one processing element, the controller comprising:
   control logic means;
   data input means including at least one input port;
   data output means including at least one output port;
   data multiplexing means;
   memory means;
   an address map; and
   synchronizing means adapted to implement at least one handshake mechanism.

8. The neural network module as claimed in claim 7, wherein the memory means of the controller includes programmable memory means.

9. The neural network module as claimed in claim 7, wherein the memory means of the controller includes buffer memory associated with said data input means and/or said data output means.

10. The neural network module as claimed in claim 7, wherein the number of processing elements in the array is a power of two.

11. A modular neural network comprising:
   one module as claimed in claim 7, or at least two modules as claimed in claim 7 coupled together.

12. The modular neural network as claimed in claim 11, wherein the modules are coupled in a lateral expansion mode and/or a hierarchical mode.

13. The modular neural network as claimed in claim 12, including synchronization means to facilitate data input to the neural network.

14. The modular neural network as claimed in claim 13, wherein said synchronization means enables data to be input only once when the modules are coupled in hierarchical mode.

15. The modular neural network as claimed in claim 13, wherein the synchronization means is adapted to implement a two-line handshake mechanism.

16. A neural network device comprising a neural network as claimed in claim 11, wherein an array of processing elements is implemented on the neural network device with at least one module controller.

17. The neural network device as claimed in claim 16, wherein the device is a field programmable gate array (FPGA) device.

18. The neural network device as claimed in claim 16, comprising one of the following: a full-custom very large scale integration (VLSI) device, a semi-custom VLSI device, or an application specific integrated circuit (ASIC) device.

19. A computer program which upon execution on a computer constitutes together with the computer upon which it is executed an apparatus according to any of the preceding claims.

20. A method of training a neural network, the method comprising the steps of:
   i. providing a network of neurons, wherein each neuron reads an input vector applied to the input of the neural network;
   ii. enabling each neuron to calculate its distance between the input vector and a reference vector consisting of weight values according to a predetermined distance metric, wherein the neuron with the minimum distance between its reference vector and the current input becomes the active neuron;
   iii. outputting the location of the active neuron; and
   iv. updating the reference vectors for all neurons located within a neighborhood around the active neuron
characterized in that in step ii. the calculation of the distance between the input vector and the reference vector said weight values are of a first bit-size, and in step iv. the updating of the reference vectors said weight values are of a second bit-size, different from the first bit-size.

21. The method as claimed in claim 20, wherein the second bit-size is greater than the first bit-size.

22. The method as claimed in claim 20, wherein in step ii. the calculation of the distance between the input vector and the reference vector uses 8-bit weight values, and in step iv. the updating of the reference vectors uses 12-bit weight values, the additional bits used in step iv. representing fractional components of weight values.

23. The method as claimed in claim 20 comprising the additional step of activating a data-bit size indicator means to indicate the bit-size of the weight values.

24. The method as claimed in claim 23 wherein the data-bit size indicator means is an update flag.

25. The method as claimed in claim 24 wherein steps ii. and iv. are executed using the same instruction set.

26. The method as claimed in any of claim 20, wherein the predetermined distance metric is the Manhattan distance metric.

27. A computer program comprising software modules adapted to implement the method of claim 20.

28. A neural network trained by the method of claim 20.

29. The neural network of claim 28 wherein the neural processing elements are coupled in a hierarchical mode.

30. The neural network of claim 28 wherein the neural processing elements are coupled in a lateral expansion mode.

* * * * *